US012556338B2

(12) United States Patent
Li et al.

(10) Patent No.: US 12,556,338 B2
(45) Date of Patent: Feb. 17, 2026

(54) INTERLEAVING OR CYCLIC SHIFTING OF A CONTROL RESOURCE SET

(71) Applicant: QUALCOMM Incorporated, San Diego, CA (US)

(72) Inventors: Qiaoyu Li, Beijing (CN); Chao Wei, Beijing (CN); Jing Lei, San Diego, CA (US); Huilin Xu, Temecula, CA (US); Peter Pui Lok Ang, San Diego, CA (US); Hao Xu, Beijing (CN); Wanshi Chen, San Diego, CA (US); Jing Dai, Beijing (CN); Min Huang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 678 days.

(21) Appl. No.: 17/759,830

(22) PCT Filed: Feb. 10, 2020

(86) PCT No.: PCT/CN2020/074582
§ 371 (c)(1),
(2) Date: Jul. 29, 2022

(87) PCT Pub. No.: WO2021/159224
PCT Pub. Date: Aug. 19, 2021

(65) Prior Publication Data
US 2023/0062118 A1    Mar. 2, 2023

(51) Int. Cl.
*H04L 5/00* (2006.01)
*H04L 1/00* (2006.01)

(52) U.S. Cl.
CPC .......... *H04L 5/0053* (2013.01); *H04L 1/0071* (2013.01); *H04L 5/0094* (2013.01)

(58) Field of Classification Search
CPC ... H04L 1/0071; H04L 5/0053; H04L 5/0094; H04W 24/08; H04W 72/0446; H04W 72/0453; H04W 72/23
See application file for complete search history.

(56) References Cited

U.S. PATENT DOCUMENTS

2018/0359755 A1    12/2018  Sun et al.
2019/0182807 A1*    6/2019  Panteleev ............. H04L 5/0048
(Continued)

FOREIGN PATENT DOCUMENTS

CN          108809505 A      11/2018
CN          108811131 A      11/2018
(Continued)

OTHER PUBLICATIONS

International Search Report and Written Opinion—PCT/CN2020/074582—ISA/EPO—Nov. 17, 2020.
(Continued)

*Primary Examiner* — Awet Haile
(74) *Attorney, Agent, or Firm* — Harrity & Harrity, LLP

(57) ABSTRACT

Various aspects of the present disclosure generally relate to wireless communication. In some aspects, a user equipment (UE) may determine at least one of an interleaving configuration or a cyclic shift configuration for respective repetitions of a control resource set (CORESET). The UE may monitor for one or more physical downlink control channel candidates in the respective repetitions of the CORESET based at least in part on determining the at least one of the interleaving configuration or the cyclic shift configuration for the respective repetitions. Numerous other aspects are provided.

30 Claims, 15 Drawing Sheets

(56) References Cited

U.S. PATENT DOCUMENTS

| | | | |
|---|---|---|---|
| 2019/0222357 A1 | 7/2019 | Huang et al. | |
| 2019/0222400 A1 | 7/2019 | Bagheri et al. | |
| 2019/0350049 A1* | 11/2019 | Miao | H04L 5/0085 |
| 2021/0058908 A1* | 2/2021 | Lin | H04L 1/0041 |
| 2021/0160827 A1* | 5/2021 | Kim | H04L 5/0094 |
| 2021/0314114 A1* | 10/2021 | Seo | H04L 1/0071 |
| 2022/0272732 A1* | 8/2022 | Sun | H04W 72/1273 |

FOREIGN PATENT DOCUMENTS

| | | | |
|---|---|---|---|
| CN | 109803402 A | 5/2019 | |
| CN | 110167036 A | 8/2019 | |
| CN | 110476377 A | 11/2019 | |
| WO | 2019137401 A1 | 7/2019 | |
| WO | WO-2019139955 A1 | 7/2019 | |

OTHER PUBLICATIONS

Nokia., et al., "Remaining Details on PDCCH Structure", 3GPP TSG RAN WG1 Meeting 91, R1-1720506, Reno, USA, Nov. 27-Dec. 1, 2017, Dec. 1, 2017 (Dec. 1, 2017) The Whole Document, 3 Pages.

Vivo: "Remaining Details on PDCCH Structure", 3GPP TSG RAN WG1 Meeting #92, R1-1801530, Athens, Greece, Feb. 26-Mar. 2, 2018, Mar. 2, 2018 (Mar. 2, 2018) The Whole Document, 5 Pages.

Supplementary European Search Report—EP20918849—Search Authority—The Hague—Oct. 26, 2023.

Vivo: "Remaining Issues for CORESET Configuration", 3GPP TSG RAN WG1 Meeting #90, R1-1714584, Prague, Czech Republic, Aug. 21-25, 2017, Aug. 19, 2017, pp. 1-4.

* cited by examiner

INTERLEAVING OR CYCLIC SHIFTING OF A CONTROL RESOURCE SET

CROSS-REFERENCE TO RELATED APPLICATION

This Patent Application is a 371 National Phase of Patent Cooperation Treaty (PCT) Patent Application No. PCT/CN2020/074582, filed on Feb. 10, 2020, entitled "INTERLEAVING OR CYCLIC SHIFTING OF A CONTROL RESOURCE SET," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for interleaving or cyclic shifting of a control resource set.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining at least one of an interleaving configuration or a cyclic shift configuration for respective repetitions of a control resource set (CORESET); and monitoring for one or more physical downlink control channel (PDCCH) candidates in the respective repetitions of the CORESET based at least in part on determining the at least one of the interleaving configuration or the cyclic shift configuration for the respective repetitions.

In some aspects, a method of wireless communication, performed by a base station, may include determining at least one of an interleaving configuration or a cyclic shift configuration for respective repetitions of a CORESET; and transmitting on one or more PDCCH candidates in the respective repetitions of the CORESET based at least in part on determining the at least one of the interleaving configuration or the cyclic shift configuration for the respective repetitions.

In some aspects, a method of wireless communication, performed by a UE, may include determining at least one of an interleaving configuration or a cyclic shift configuration for a CORESET that is in more than three symbols, wherein resource element group (REG) bundles of the CORESET are to be mapped to symbol groups of the more than three symbols; and monitoring for one or more PDCCH candidates in the CORESET based at least in part on determining the at least one of the interleaving configuration or the cyclic shift configuration.

In some aspects, a method of wireless communication, performed by a base station, may include determining at least one of an interleaving configuration or a cyclic shift configuration for a CORESET that is in more than three symbols, wherein REG bundles of the CORESET are to be mapped to symbol groups of the more than three symbols; and transmitting on one or more PDCCH candidates in the CORESET based at least in part on determining the at least one of the interleaving configuration or the cyclic shift configuration.

In some aspects, a UE for wireless communication may include memory and one or more processors operatively coupled to the memory. The memory and the one or more processors may be configured to determine at least one of an interleaving configuration or a cyclic shift configuration for respective repetitions of a CORESET; and monitor for one or more PDCCH candidates in the respective repetitions of the CORESET based at least in part on determining the at least one of the interleaving configuration or the cyclic shift configuration for the respective repetitions.

In some aspects, a BS for wireless communication may include memory and one or more processors operatively coupled to the memory. The memory and the one or more processors may be configured to determine at least one of an interleaving configuration or a cyclic shift configuration for respective repetitions of a CORESET; and transmit on one or more PDCCH candidates in the respective repetitions of the CORESET based at least in part on determining the at least one of the interleaving configuration or the cyclic shift configuration for the respective repetitions.

In some aspects, a UE for wireless communication may include memory and one or more processors operatively coupled to the memory. The memory and the one or more processors may be configured to determine at least one of an interleaving configuration or a cyclic shift configuration for a CORESET that is in more than three symbols, wherein REG bundles of the CORESET are to be mapped to symbol groups of the more than three symbols; and monitor for one or more PDCCH candidates in the CORESET based at least in part on determining the at least one of the interleaving configuration or the cyclic shift configuration.

In some aspects, a BS for wireless communication may include memory and one or more processors operatively coupled to the memory. The memory and the one or more processors may be configured to determine at least one of an interleaving configuration or a cyclic shift configuration for a CORESET that is in more than three symbols, wherein REG bundles of the CORESET are to be mapped to symbol groups of the more than three symbols; and transmit on one or more PDCCH candidates in the CORESET based at least in part on determining the at least one of the interleaving configuration or the cyclic shift configuration.

In some aspects, a non-transitory computer-readable medium may store one or more instructions for wireless communication. The one or more instructions, when executed by one or more processors of a UE, may cause the one or more processors to: determine at least one of an interleaving configuration or a cyclic shift configuration for respective repetitions of a CORESET; and monitor for one or more PDCCH candidates in the respective repetitions of the CORESET based at least in part on determining the at least one of the interleaving configuration or the cyclic shift configuration for the respective repetitions.

In some aspects, a non-transitory computer-readable medium may store one or more instructions for wireless communication. The one or more instructions, when executed by one or more processors of a BS, may cause the one or more processors to: determine at least one of an interleaving configuration or a cyclic shift configuration for respective repetitions of a CORESET; and transmit on one or more PDCCH candidates in the respective repetitions of the CORESET based at least in part on determining the at least one of the interleaving configuration or the cyclic shift configuration for the respective repetitions.

In some aspects, a non-transitory computer-readable medium may store one or more instructions for wireless communication. The one or more instructions, when executed by one or more processors of a UE, may cause the one or more processors to: determine at least one of an interleaving configuration or a cyclic shift configuration for a CORESET that is in more than three symbols, wherein REG bundles of the CORESET are to be mapped to symbol groups of the more than three symbols; and monitor for one or more PDCCH candidates in the CORESET based at least in part on determining the at least one of the interleaving configuration or the cyclic shift configuration.

In some aspects, a non-transitory computer-readable medium may store one or more instructions for wireless communication. The one or more instructions, when executed by one or more processors of a BS, may cause the one or more processors to: determine at least one of an interleaving configuration or a cyclic shift configuration for a CORESET that is in more than three symbols, wherein REG bundles of the CORESET are to be mapped to symbol groups of the more than three symbols; and transmit on one or more PDCCH candidates in the CORESET based at least in part on determining the at least one of the interleaving configuration or the cyclic shift configuration.

In some aspects, an apparatus for wireless communication may include means for determining at least one of an interleaving configuration or a cyclic shift configuration for respective repetitions of a CORESET; and means for monitoring for one or more PDCCH candidates in the respective repetitions of the CORESET based at least in part on determining the at least one of the interleaving configuration or the cyclic shift configuration for the respective repetitions.

In some aspects, an apparatus for wireless communication may include means for determining at least one of an interleaving configuration or a cyclic shift configuration for respective repetitions of a CORESET; and means for transmitting on one or more PDCCH candidates in the respective repetitions of the CORESET based at least in part on determining the at least one of the interleaving configuration or the cyclic shift configuration for the respective repetitions.

In some aspects, an apparatus for wireless communication may include means for determining at least one of an interleaving configuration or a cyclic shift configuration for a CORESET that is in more than three symbols, wherein REG bundles of the CORESET are to be mapped to symbol groups of the more than three symbols; and means for monitoring for one or more PDCCH candidates in the CORESET based at least in part on determining the at least one of the interleaving configuration or the cyclic shift configuration.

In some aspects, an apparatus for wireless communication may include means for determining at least one of an interleaving configuration or a cyclic shift configuration for a CORESET that is in more than three symbols, wherein REG bundles of the CORESET are to be mapped to symbol groups of the more than three symbols; and means for transmitting on one or more PDCCH candidates in the CORESET based at least in part on determining the at least one of the interleaving configuration or the cyclic shift configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
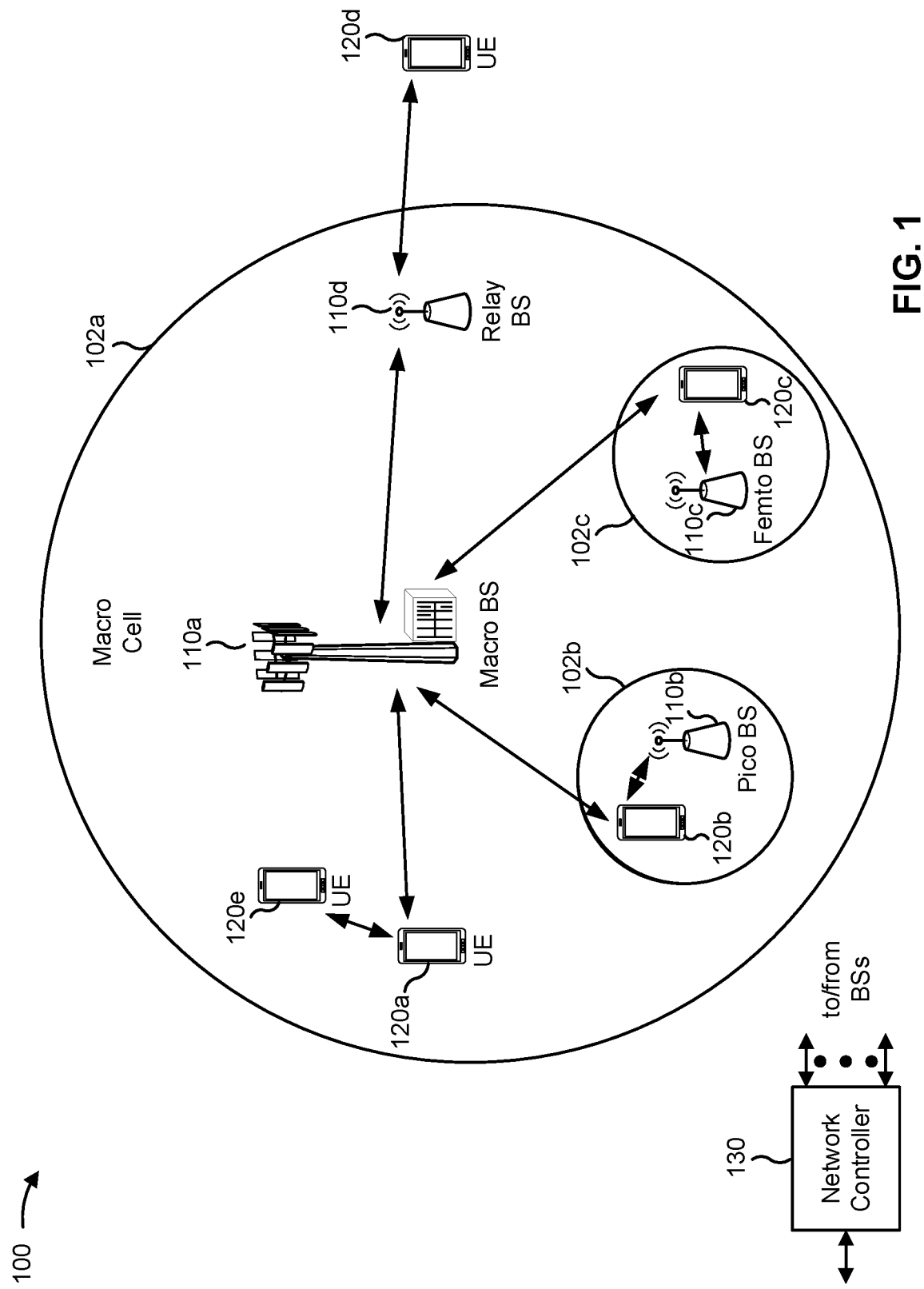
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IOT) devices, and/or may be implemented as NB-IOT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
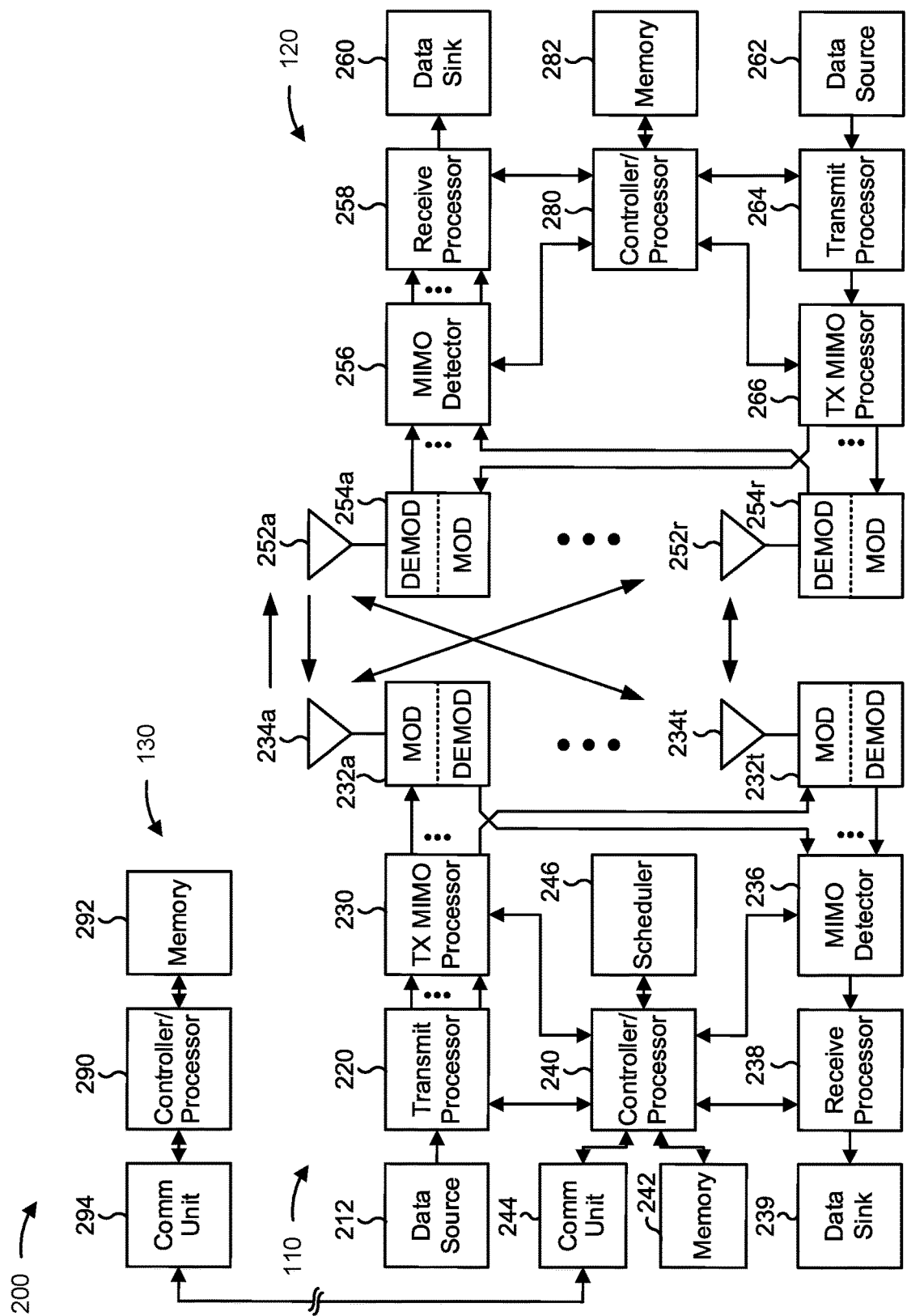
FIG. 2 is a block diagram conceptually illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with interleaving or cyclic shifting of a control resource set (CORESET), as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 900 of FIG. 9, process 1000 of FIG. 10, process 1100 of FIG. 11, process 1200 of FIG. 12, and/or other processes as described herein. A scheduler 246 may schedule UEs for data transmission on the downlink and/or uplink.

In some aspects, UE 120 may include means for determining at least one of an interleaving configuration or a cyclic shift configuration for respective repetitions of a CORESET, means for monitoring for one or more physical downlink control channel (PDCCH) candidates in the respective repetitions of the CORESET based at least in part on determining the at least one of the interleaving configuration or the cyclic shift configuration for the respective repetitions, means for determining at least one of an interleaving configuration or a cyclic shift configuration for a CORESET that is in more than three symbols, wherein resource element group (REG) bundles of the CORESET are to be mapped to symbol groups of the more than three symbols, means for monitoring for one or more PDCCH candidates in the CORESET based at least in part on determining the at least one of the interleaving configuration or the cyclic shift configuration, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining at least one of an interleaving configuration or a cyclic shift configuration for respective repetitions of a CORESET, means for transmitting on one or more PDCCH candidates in the respective repetitions of the CORESET based at least in part on determining the at least one of the interleaving configuration or the cyclic shift configuration for the respective repetitions, means for determining at least one of an interleaving configuration or a cyclic shift configuration for a CORESET that is in more than three symbols, wherein REG bundles of the CORESET are to be mapped to symbol groups of the more than three symbols, means for transmitting on one or more PDCCH candidates in the CORESET based at least in part on determining the at least one of the interleaving configuration or the cyclic shift configuration, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3A:
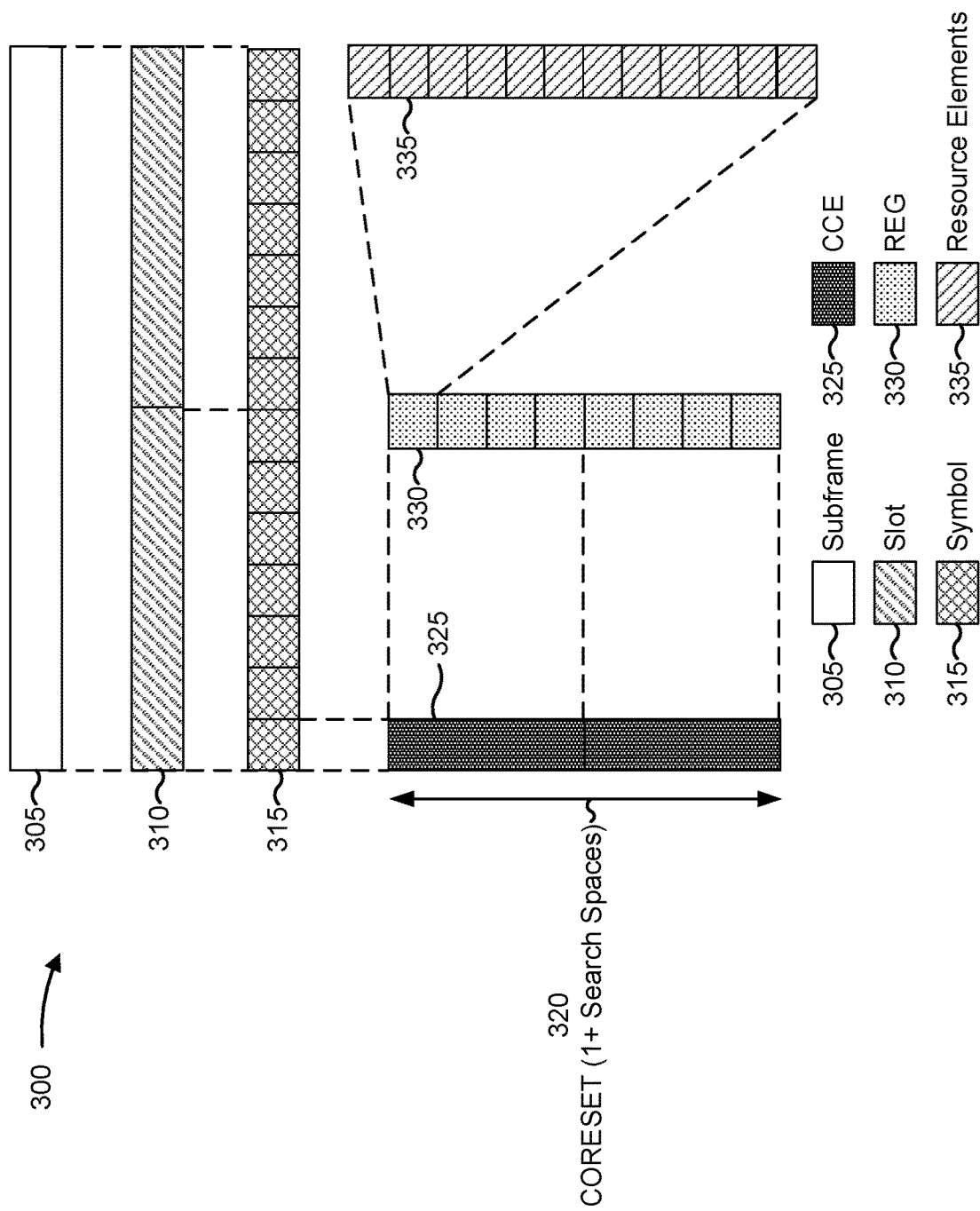
FIG. 3A is a diagram illustrating an example resource structure for wireless communication, in accordance with various aspects of the present disclosure.

FIG. 3A illustrates an example resource structure 300 for wireless communication, in accordance with various aspects of the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, and/or the like). In some aspects, different types of transmission time intervals (TTIs) may be used, other than subframes and/or slots. A slot 310 may include multiple symbols 315, such as 7 symbols or 14 symbols per slot.

The potential control region of a slot 310 may be referred to as a CORESET 320, and may be structured to support an efficient use of resources, such as by flexible configuration or reconfiguration of resources of the CORESET 320 for one or more PDCCHs, one or more physical downlink shared channels (PDSCHs), and/or the like. In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A base station may transmit DCI during multiple CCEs 325 (as shown), where the quantity of CCEs 325 used for transmission of DCI represents the aggregation level (AL) used by the BS for the transmission of DCI. In FIG. 3A, an aggregation level of two is shown as an example, corresponding to two CCEs 325 in a slot 310. In some aspects, different aggregation levels may be used, such as 1, 4, 8, 16, and/or the like.

Each CCE 325 may include a fixed quantity of REGs 330, shown as 4 REGs 330, or may include a variable quantity of REGs 330. In some aspects, the quantity of REGs 330 included in a CCE 325 may be specified by an REG bundle size. An REG 330 may include one resource block, which may include 12 resource elements (REs) 335 within a symbol 315. A resource element 335 may occupy one subcarrier in the frequency domain and one OFDM symbol in the time domain.

A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs), an aggregation level being used, and/or the like. A possible location (e.g., in time and/or frequency) for a PDCCH may be referred to as a PDCCH candidate, and the set of all possible PDCCH locations may be referred to as a search space. For example, the set of all possible PDCCH locations for a particular UE may be referred to as a UE-specific search space. Similarly, the set of all possible PDCCH locations across all UEs may be referred to as a common search space. Similarly, the set of all possible PDCCH locations for a particular group of UEs may be referred to as a group-common search space.

In order to decode a PDCCH, a UE may need the PDCCH to use a particular aggregation level (e.g., include a particular quantity of CCEs). For example, a UE with reduced capability and/or at a cell edge may be unable to decode a PDCCH that uses an aggregation level below a threshold value.

In particular, different types of UEs may operate in a cell provided by a BS. For example, a BS may provide network service to a premium UE (which may be termed a legacy UE or a high-tier UE), an NR-Light (or NR-Lite) UE (which may be termed a low-tier UE), and/or the like. A premium UE may be a UE that is associated with a receive bandwidth capability in receiving downlink signals/channels that is above a particular threshold (for example, a bandwidth of greater than or equal to 100 megahertz (MHz)). In contrast, an NR-Light UE may be a UE with a bandwidth capability in receiving the downlink signals/channels that is below a particular threshold (for example, a bandwidth of less than 10 MHz, less than 5 MHZ, or the like). Moreover, an NR-Light UE may have a lesser quantity of receive antennas or a lower computational or memory capacity than a premium UE.

Accordingly, NR-Light UEs that have reduced capability (e.g., a lesser quantity of receive antennas) may be unable to decode a PDCCH that is below a particular aggregation level. However, due to the reduced capability of an NR-Light UE, it may not be possible to configure an NR-Light UE with a CORESET that includes a quantity of resource blocks that would permit higher aggregation levels. Thus, in some cases, a greater quantity of resource blocks may be included by expanding the CORESET using multiple repetitions of the CORESET or using more than three symbols for the CORESET. However, a UE (e.g., an NR-Light UE) and/or a BS may not be enabled to determine an interleaving configuration and/or a cyclic shift configuration for such an expanded CORESET. Some techniques and apparatuses described herein enable interleaving configuration and/or cyclic shift configuration for multiple repetitions of a CORESET and/or for a CORESET in more than three symbols. In this way, performance of a PDCCH may be improved (e.g., for an NR-Light UE).

As indicated above, FIG. 3A is provided as an example. Other examples may differ from what is described with regard to FIG. 3A.

Figure 3B:
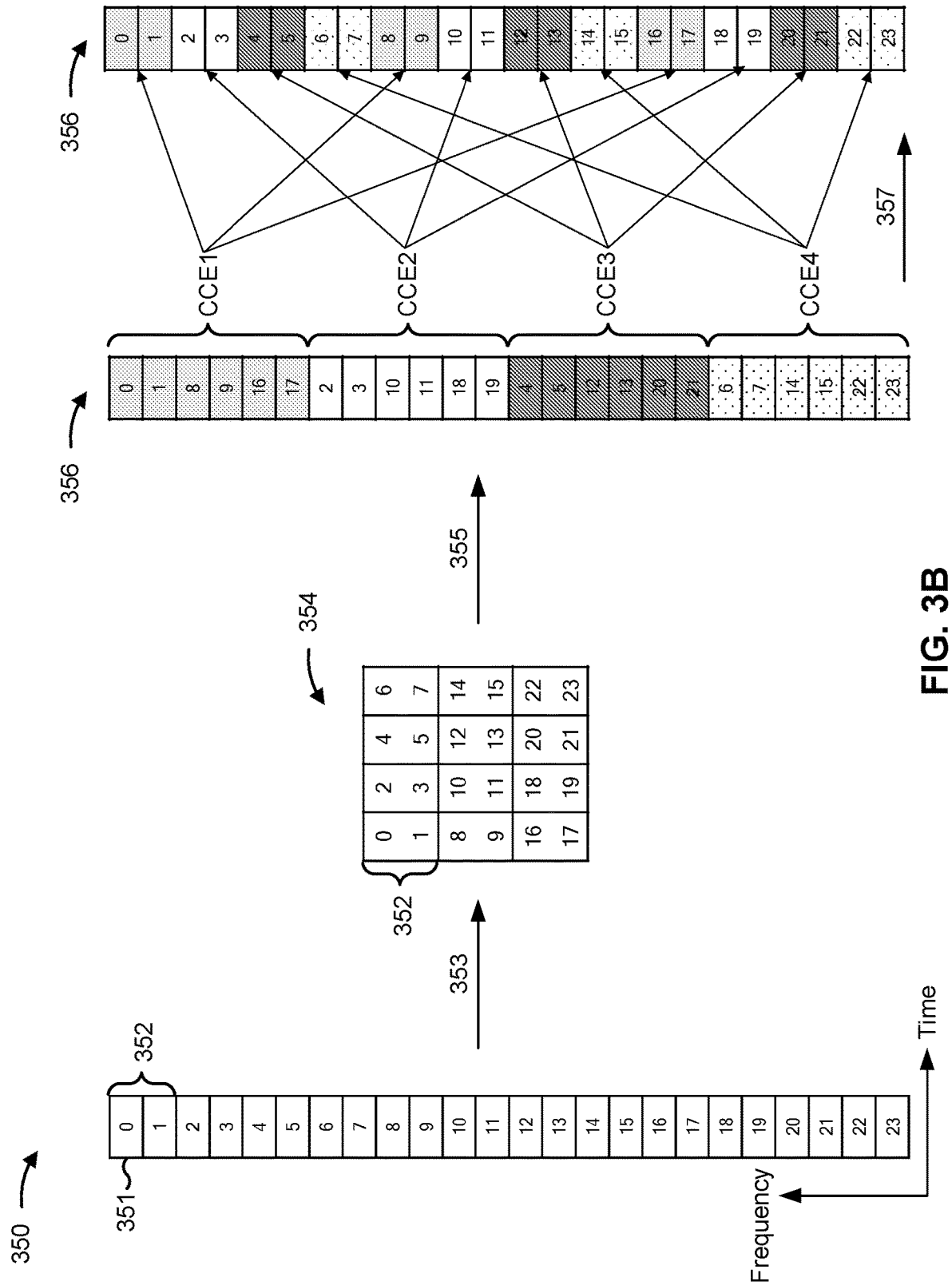
FIGS. 3B-3D are diagrams illustrating examples of interleaving of a control resource set (CORESET), in accordance with various aspects of the present disclosure.

FIG. 3B is a diagram illustrating an example 350 of interleaving of a CORESET, in accordance with various aspects of the present disclosure. In particular, example 350 may illustrate an example of interleaving a CORESET that is in three or fewer symbols (e.g., one symbol, two symbols, or three symbols). As shown in FIG. 3B, an REG bundle 352 may be configured to include two REGs 351 (i.e., the REG bundle 352 may be configured to have a size of two REGs 351). That is, the REG bundle 352 may have an REG bundle shape that includes two REGs 351 in a frequency domain and one symbol in a time domain (e.g., for a CORESET 356 in one symbol).

As shown by reference number 353, the REG bundles 352 may be written into a matrix 354 according to an interleaving configuration. For example, the interleaving configuration may indicate a quantity of rows that are to be used for interleaving. As shown, the quantity of rows may be three (e.g., the matrix 354 may include three rows). The REG bundles 352 may be written into the matrix 354 by row, such that the REG bundles 352 are written to a first row of the matrix 354 first, a second row of the matrix 354 second, and so forth.

As shown by reference number 355, the REG bundles 352 may be read out of the matrix 354, in REG bundle units, and mapped to a plurality of CCEs (CCE1, CCE2, CCE3, and CCE4) of a CORESET 356. For example, the REG bundles 352 may be read out of the matrix 354, by column, and mapped to the plurality of CCEs. As an example, REG bundles 352 in a first column of the matrix 354 are mapped to the plurality of CCEs first, REG bundles 352 in a second column are mapped to the plurality of CCEs second, and so forth. A CCE may include six REGs 351 (i.e., three REG bundles 352 of two REGs 351).

As shown by reference number 357, the mapping of the REG bundles 352 to the plurality of CCEs of the CORESET 356 may result in an interleaving of the REG bundles 352 in the plurality of CCEs of the CORESET 356.

As described above, an REG bundle 352 may have an REG bundle shape that includes one symbol in a time domain, thereby enabling the REG bundle 352 to be mapped to a CORESET 356 in one symbol. However, some wireless telecommunication systems may not enable mapping of an REG bundle that is in one symbol (i.e., a legacy REG bundle shape) to a CORESET that is in more than three symbols. Some techniques and apparatuses described herein enable mapping of such a legacy REG bundle shape to a CORESET that is in more than three symbols.

As indicated above, FIG. 3B is provided as an example. Other examples may differ from what is described with respect to FIG. 3B.

Figure 3C:
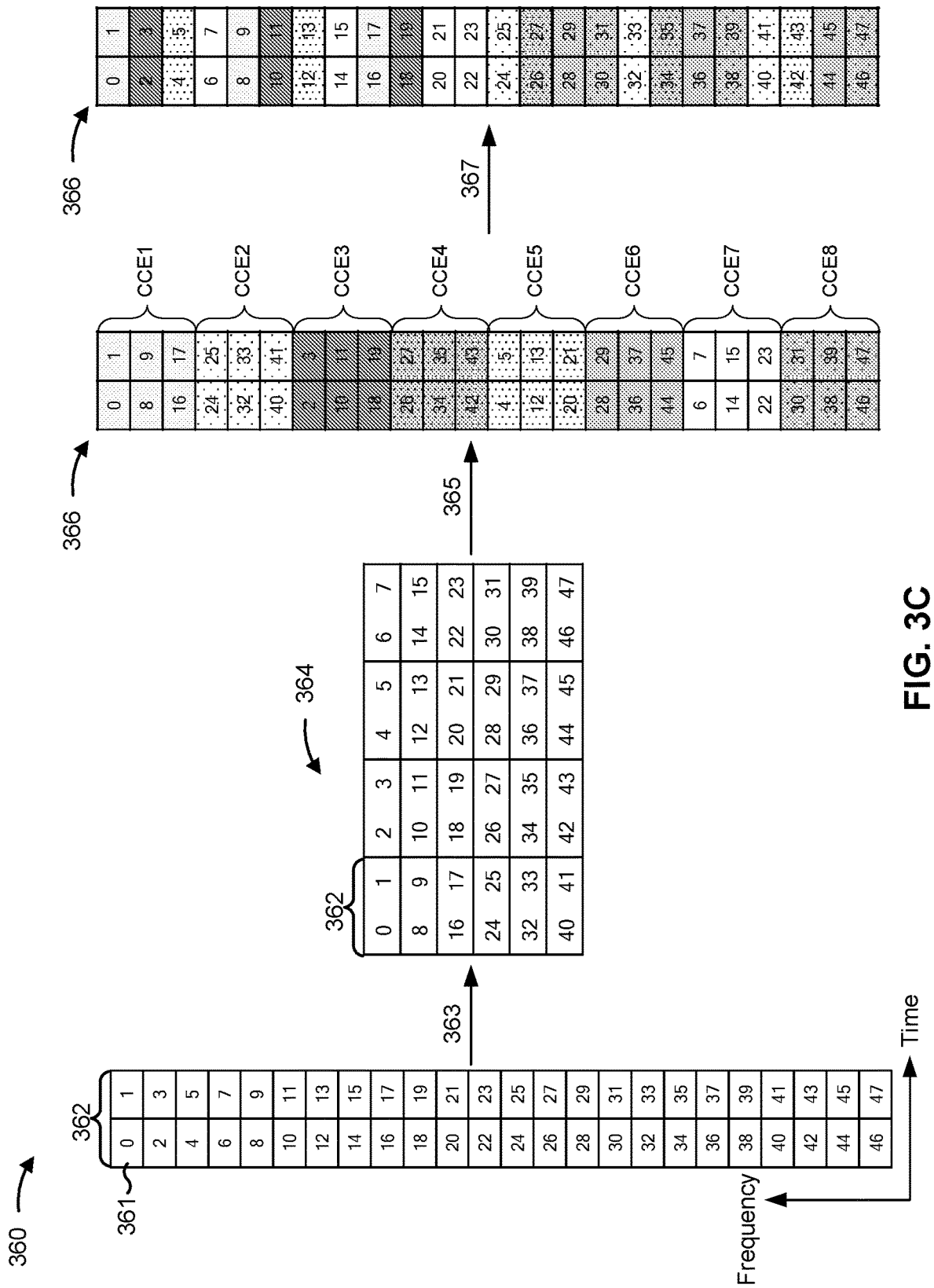

FIG. 3C is a diagram illustrating an example 360 of interleaving of a CORESET, in accordance with various aspects of the present disclosure. In particular, example 360 may illustrate an example of interleaving a CORESET that is in three or fewer symbols. As shown in FIG. 3C, an REG bundle 362 may be configured to include two REGs 361. That is, the REG bundle 362 may have an REG bundle shape that includes two REGs 361 in two symbols in the time domain (e.g., for a CORESET 366 in two symbols).

As shown by reference number 363, the REG bundles 362 may be written into a matrix 364 according to an interleaving configuration, as described above in connection with FIG. 3B. For example, the interleaving configuration may indicate a quantity of rows that are to be used for interleaving. As shown, the quantity of rows may be six (e.g., the matrix 364 may include six rows).

As shown by reference number 365, the REG bundles 362 may be read out of the matrix 364, in REG bundle units, and mapped to a plurality of CCEs (CCE1-CCE8) of a CORESET 366, as described above in connection with FIG. 3B.

As shown by reference number 367, the mapping of the REG bundles 362 to the plurality of CCEs of the CORESET 366 may result in an interleaving of the REG bundles 362 in the plurality of CCEs of the CORESET 366.

As described above, an REG bundle 362 may have an REG bundle shape that includes two symbols in a time domain, thereby enabling the REG bundle 362 to be mapped to a CORESET 366 in two symbols. However, some wireless telecommunication systems may not enable mapping of an REG bundle that is in two symbols (i.e., a legacy REG bundle shape) to a CORESET that is in more than three symbols. Some techniques and apparatuses described herein enable mapping of such a legacy REG bundle shape to a CORESET that is in more than three symbols.

As indicated above, FIG. 3C is provided as an example. Other examples may differ from what is described with respect to FIG. 3C.

Figure 3D:
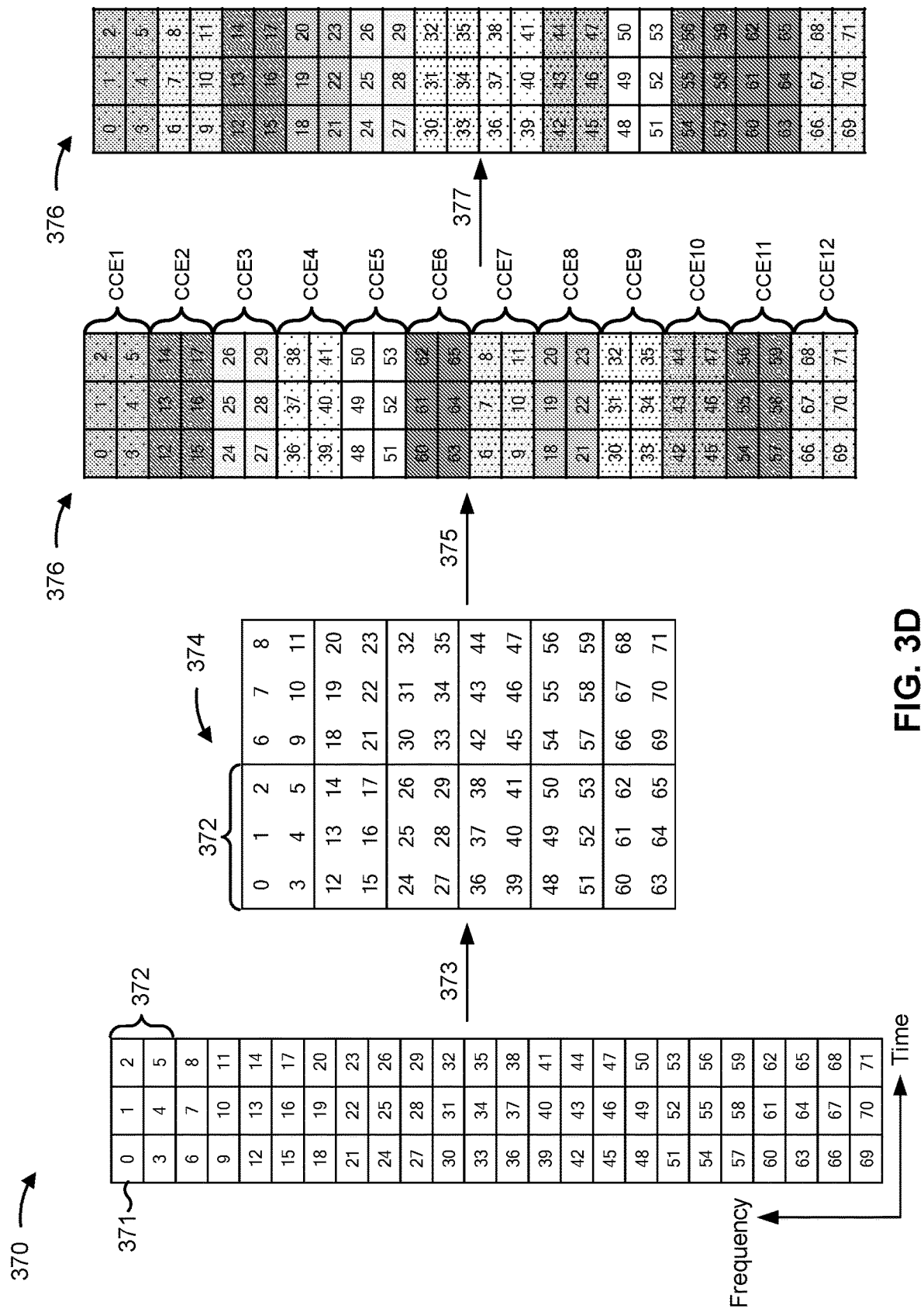

FIG. 3D is a diagram illustrating an example 370 of interleaving of a CORESET, in accordance with various aspects of the present disclosure. In particular, example 370 may illustrate an example of interleaving a CORESET that is in three or fewer symbols. As shown in FIG. 3D, an REG bundle 372 may be configured to include six REGs 371. That is, the REG bundle 372 may have an REG bundle shape that includes two REGs 371 in the frequency domain in three symbols in the time domain (e.g., for a CORESET 376 in three symbols).

As shown by reference number 373, the REG bundles 372 may be written into a matrix 374 according to an interleaving configuration, as described above in connection with FIG. 3B. For example, the interleaving configuration may indicate a quantity of rows that are to be used for interleaving. As shown, the quantity of rows may be six (e.g., the matrix 374 may include six rows).

As shown by reference number 375, the REG bundles 372 may be read out of the matrix 374, in REG bundle units, and mapped to a plurality of CCEs (CCE1-CCE12) of a CORESET 376, as described above in connection with FIG. 3B.

As shown by reference number 377, the mapping of the REG bundles 372 to the plurality of CCEs of the CORESET 376 may result in an interleaving of the REG bundles 372 in the plurality of CCEs of the CORESET 376.

As described above, an REG bundle 372 may have an REG bundle shape that includes three symbols in a time domain, thereby enabling the REG bundle 372 to be mapped to a CORESET 376 in three symbols. However, some wireless telecommunication systems may not enable mapping of an REG bundle that is in three symbols (i.e., a legacy REG bundle shape) to a CORESET that is in more than three symbols. Some techniques and apparatuses described herein enable mapping of such a legacy REG bundle shape to a CORESET that is in more than three symbols.

As indicated above, FIG. 3D is provided as an example. Other examples may differ from what is described with respect to FIG. 3D.

Figure 4:
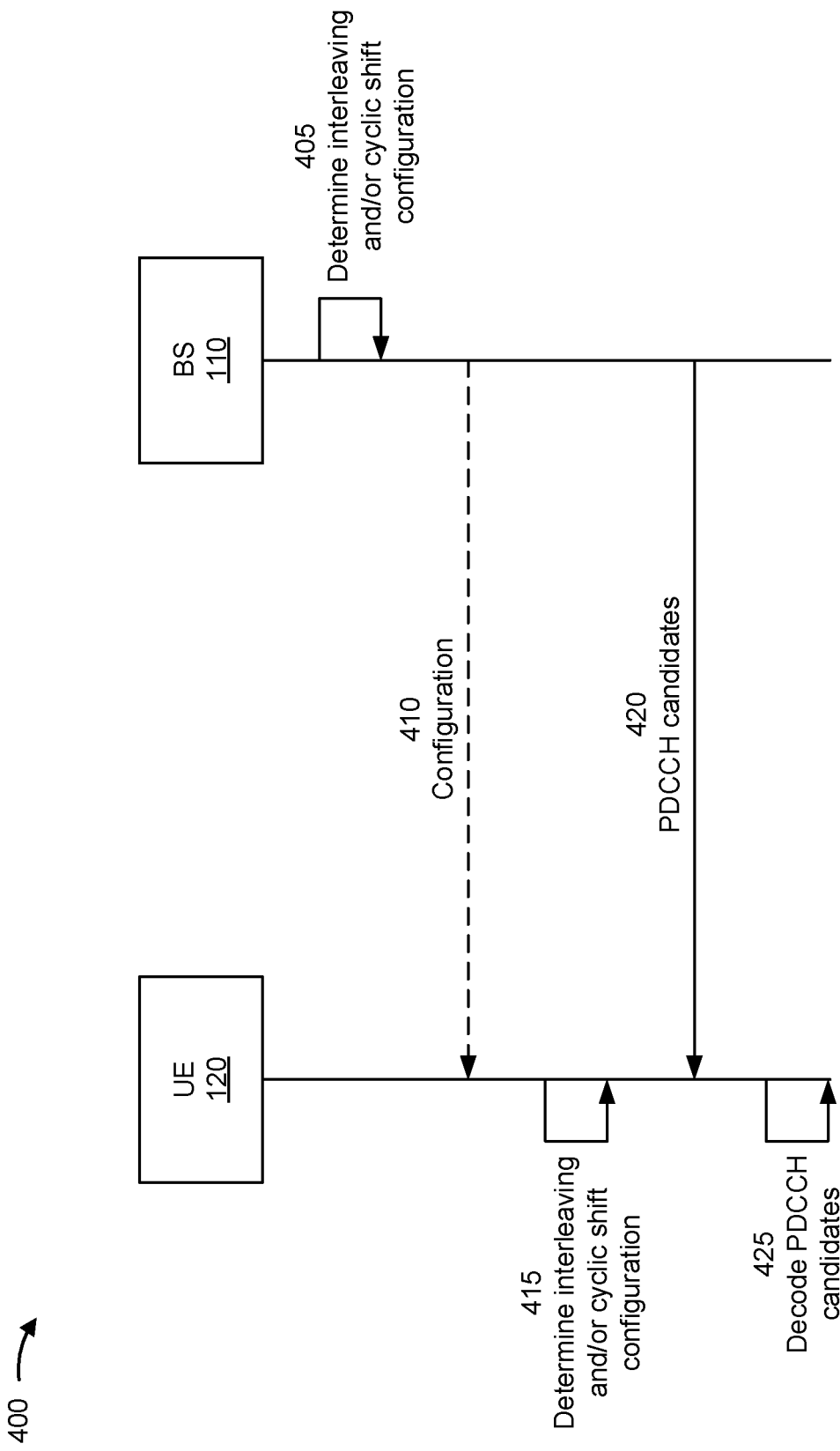
FIG. 4 is a diagram illustrating an example an example of interleaving or cyclic shifting of a CORESET, in accordance with various aspects of the present disclosure.

FIG. 4 is a diagram illustrating an example 400 of interleaving or cyclic shifting of a CORESET, in accordance with various aspects of the present disclosure. As shown in FIG. 4, a BS 110 may communicate with a UE 120 in connection with a PDCCH communication. In some aspects, the UE 120 may be an NR-Light UE, such as a wearable device, an Internet of Things (IOT) device, a sensor, a camera, and/or the like, that is associated with a limited bandwidth, power capacity, transmission range, and/or the like. For example, the UE 120 may have a quantity of receive antennas that satisfies (e.g., is below) a threshold value and/or a bandwidth capability that satisfies (e.g., is below) a threshold value.

As shown in FIG. 4, and by reference number 405, the BS 110 may determine an interleaving configuration and/or a cyclic shift configuration that is to be used for a CORESET (e.g., a CORESET in which the BS 110 is to transmit a PDCCH to the UE 120 on one or more PDCCH candidates).

As shown by reference number 410, the BS 110 may transmit, and the UE 120 may receive, the interleaving configuration and/or the cyclic shift configuration that is determined. For example, the BS 110 may transmit the interleaving configuration and/or the cyclic shift configuration in a PDCCH configuration, a CORESET configuration, and/or the like. The BS 110 may transmit the interleaving configuration and/or the cyclic shift configuration by RRC signaling. In some aspects, the BS 110 may not transmit the interleaving configuration and/or the cyclic shift configuration to the UE 120, such as when the interleaving configuration and/or the cyclic shift configuration is determined by the UE 120 in another manner, as described below.

As shown by reference number 415, the UE 120 may determine an interleaving configuration and/or a cyclic shift configuration that is to be used for a CORESET (e.g., a CORESET in which the BS 110 is to transmit a PDCCH to the UE 120 on one or more PDCCH candidates). In some aspects, an interleaving configuration may identify an interleaving pattern for the CORESET, such as a quantity of rows that is to be used for interleaving (e.g., a quantity of rows of a matrix into which REG bundles are to be written). In some aspects, a cyclic shift configuration may identify a cyclic shift index (e.g., a ShiftIndex parameter) for the CORESET (e.g., an index of an REG, a resource block, or the like, from which REG bundles of the CORESET are to be cyclic shifted).

In some aspects, the CORESET may be in more than three symbols, as described in connection with FIGS. 5-8. In some aspects, the UE 120 may determine an interleaving configuration and/or a cyclic shift configuration that is to be used for respective repetitions of the CORESET. For example, the UE 120 may determine a first interleaving configuration (e.g., a first quantity of rows that are to be used for interleaving) and/or cyclic shift configuration (e.g., a first cyclic shift index) for a first repetition of the CORESET, a second interleaving configuration (e.g., a second quantity of rows that are to be used for interleaving) and/or cyclic shift configuration (e.g., a second cyclic shift index) for a second repetition of the CORESET, and so forth. The repetitions of the CORESET may be inter-slot repetitions (e.g., repetitions occurring in multiple slots) and/or intra-slot repetitions (e.g., repetitions occurring in a single slot).

In some aspects, such as when the BS 110 transmits the interleaving configuration and/or the cyclic shift configuration (e.g., by RRC signaling), the UE 120 may determine the interleaving configuration and/or the cyclic shift configuration based at least in part on the configuration(s) that is transmitted by the BS 110. In some aspects, the UE 120 may determine the interleaving configuration and/or the cyclic shift configuration in another manner.

For example, the UE 120 may determine an interleaving configuration and/or a cyclic shift configuration for a particular repetition of the CORESET based at least in part on a slot index associated with the repetition (e.g., for an inter-slot repetition) and/or a starting symbol index associated with the repetition (e.g., for an intra-slot repetition). As an example, the UE 120 may determine a first interleaving configuration and/or cyclic shift configuration for a first repetition of the CORESET based at least in part on a slot index and/or a starting symbol index of the first repetition, a second interleaving configuration and/or cyclic shift configuration for a second repetition of the CORESET based at least in part on a slot index and/or a starting symbol index of the second repetition, and so forth. In this case, the BS 110 also may determine a corresponding interleaving configuration and/or a corresponding cyclic shift configuration for a particular repetition of the CORESET in a similar manner.

As shown by reference number 420, the BS 110 may transmit on one or more PDCCH candidates in the CORESET. That is, the BS 110 may transmit one or more PDCCHs for the UE 120 on the one or more PDCCH candidates. In some aspects, such as when the CORESET is repeated in multiple repetitions, the BS 110 may transmit on one or more PDCCH candidates in the multiple repetitions of the CORESET. The BS 110 may transmit on the one or more PDCCH candidates using an interleaving pattern and/or a cyclic shift in accordance with an interleaving configuration and/or a cyclic shift configuration determined by the BS 110.

As shown by reference number 425, the UE 120 may monitor for one or more PDCCH candidates in the CORESET. In some aspects, such as when the CORESET is repeated in multiple repetitions, the UE 120 may monitor for one or more PDCCH candidates in the multiple repetitions of the CORESET. The UE 120 may monitor for the one or more PDCCH candidates in accordance with an interleaving configuration and/or a cyclic shift configuration determined by the UE 120 (e.g., for a particular repetition of the CORESET). That is, the UE 120 may decode (e.g., deinterleave and/or de-shift) one or more PDCCHs in the one or more PDCCH candidates using an interleaving pattern and/or a cyclic shift in accordance with an interleaving configuration and/or a cyclic shift configuration determined by the UE 120 (e.g., for a particular repetition of the CORESET).

As indicated above, FIG. 4 is provided as an example. Other examples may differ from what is described with respect to FIG. 4.

Figure 5:
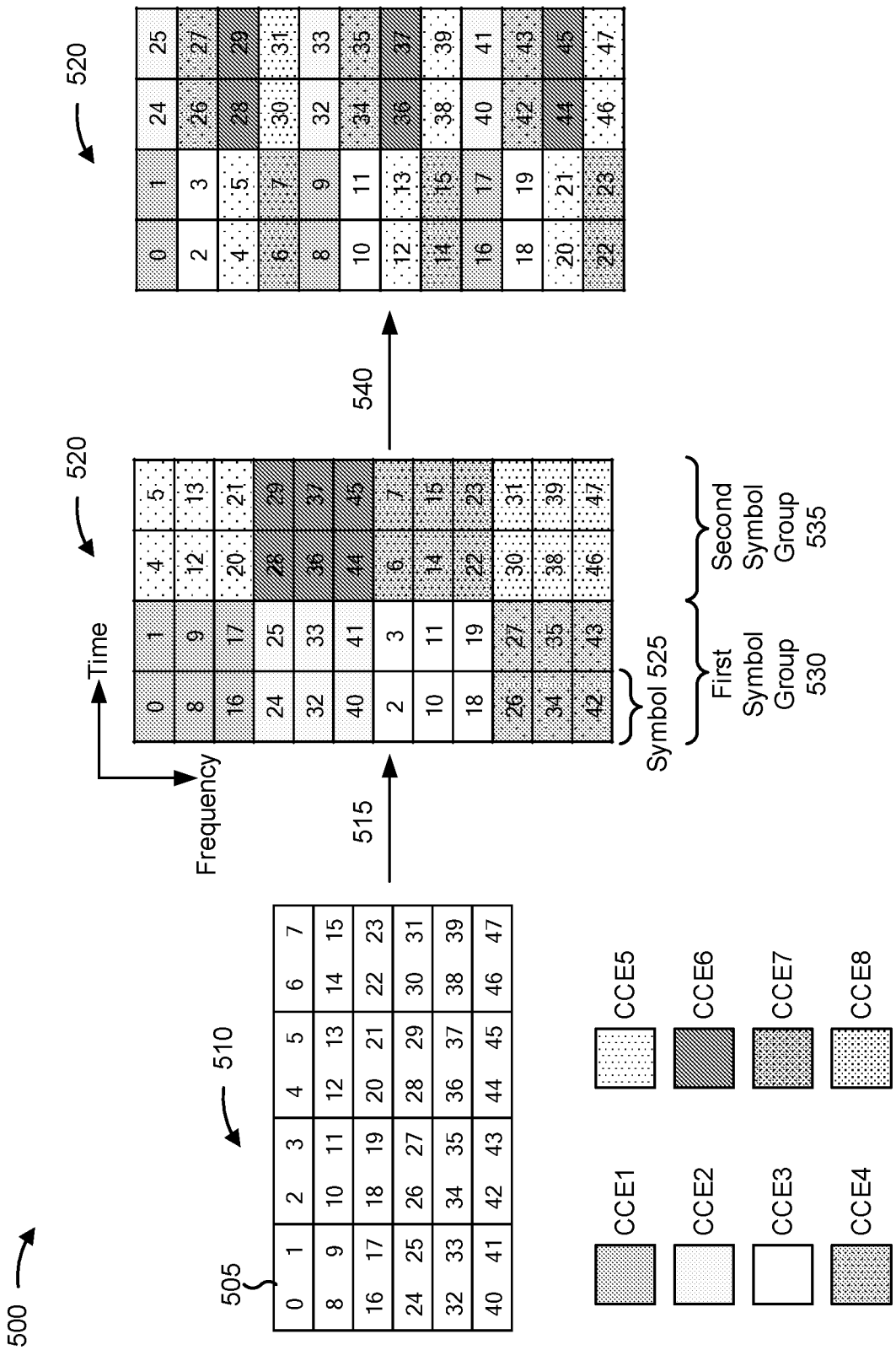
FIGS. 5 and 6 are diagrams illustrating examples of interleaving of a CORESET, in accordance with various aspects of the present disclosure.

FIG. 5 is a diagram illustrating an example 500 of interleaving of a CORESET, in accordance with various aspects of the present disclosure. In particular, example 500 may illustrate an example of interleaving a CORESET that is in more than three symbols (e.g., four symbols, six symbols, eight symbols, twelve symbols, or the like).

As shown in FIG. 5, a plurality of REG bundles 505 may be written into a matrix 510 (e.g., by BS 110), as described in connection with FIGS. 3B-3D. An REG bundle 505 may be configured to include a particular quantity of REGs (e.g., two REGs, as shown). The REG bundles 505 may be written into multiple rows of the matrix 510 (e.g., six rows, as shown). The multiple rows of the matrix 510 may include a quantity of rows that is configured by an interleaving configuration, as described in connection with FIG. 4.

As shown by reference number 515, the REG bundles 505 may be read out of the matrix 510 (e.g., by BS 110), in REG bundle units, and mapped (e.g., by BS 110) to a plurality of CCEs (CCE1-CCE8) of a CORESET 520, as described in connection with FIGS. 3B-3D. For example, the REG bundles 505 may be read out of the matrix 510, by column, and mapped to the plurality of CCEs. As described above, the CORESET 520 may be in more than three symbols 525 (e.g., four symbols 525, as shown).

In some aspects, the REG bundles 505 may be mapped to symbol groups of the CORESET 520. For example, the more than three symbols of the CORESET 520 may be grouped into two or more symbol groups (e.g., that include equivalent quantities of symbols 525). As shown in FIG. 5, the REG bundles 505 may be mapped to a first symbol group 530 that includes two symbols 525 and a second symbol group 535 that includes two symbols 525. A CCE, of the plurality of CCEs, may include a quantity of symbols 525 that corresponds to a quantity of symbols 525 in a symbol group. Moreover, a quantity of symbols 525 in a symbol group may correspond to a quantity of symbols 525 in an REG bundle 505. In this way, an REG bundle in three or fewer symbols (e.g., an REG bundle in an REG bundle shape, as described in connection with FIGS. 3B-3D) may be mapped to a CORESET in more than three symbols.

In some aspects, as shown in FIG. 5, the REG bundles 505 may be mapped to symbol groups first by frequency and second by time. For example, the REG bundles 505 (which are read out of the matrix 510 by column) may be mapped first to resources in the first symbol group 530 and mapped second to resources in the second symbol group 535. In other words, the REG bundles 505 may be mapped to resources in the first symbol group before being mapped to resources in the second symbol group 535.

As shown by reference number 540, the mapping of the REG bundles 505 to the plurality of CCEs (e.g., first by frequency and second by time) may result in an interleaving of the REG bundles 505 in the plurality of CCEs of the CORESET 520. In this way, REG bundles 505 of the same PDCCH may be distributed across different symbols 525 and/or resource blocks, thereby improving a diversity of the PDCCH.

As indicated above, FIG. 5 is provided as an example. Other examples may differ from what is described with respect to FIG. 5.

Figure 6:
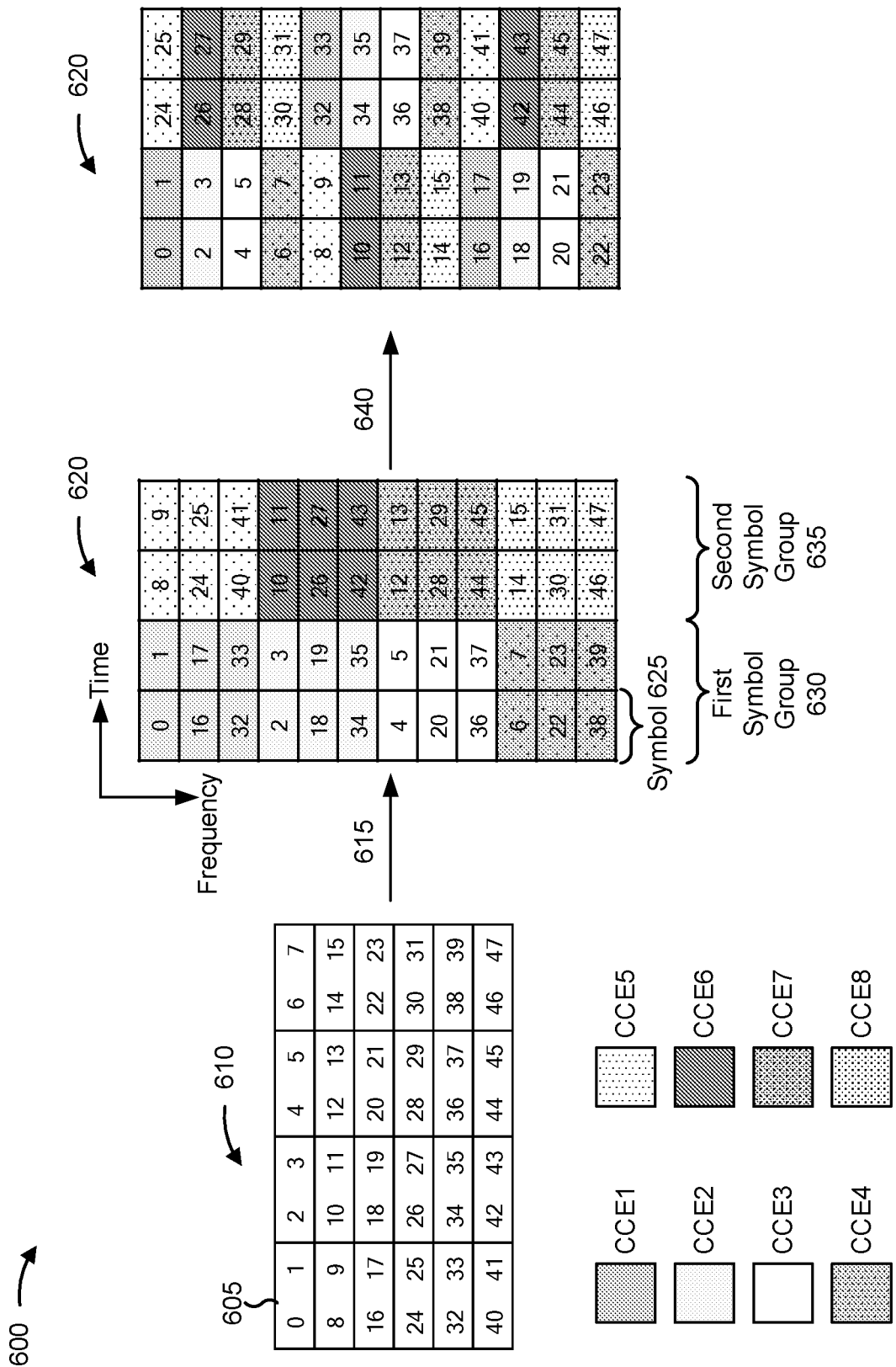

FIG. 6 is a diagram illustrating an example 600 of interleaving of a CORESET, in accordance with various aspects of the present disclosure. In particular, example 600 may illustrate an example of interleaving a CORESET that is in more than three symbols (e.g., four symbols, six symbols, eight symbols, twelve symbols, or the like).

As shown in FIG. 6, a plurality of REG bundles 605 may be written into a matrix 610 (e.g., by BS 110), as described in connection with FIG. 5. For example, the REG bundles 605 may be written into the matrix 610 by row. As shown by reference number 615, the REG bundles 605 may be read out of the matrix 610 (e.g., by BS 110), in REG bundle units, and mapped (e.g., by BS 110) to a plurality of CCEs (CCE1-CCE8) of a CORESET 620, as described in connection with FIG. 5. For example, the REG bundles 505 may be read out of the matrix 610, by column, and mapped to the plurality of CCEs. As described above, the CORESET 620 may be in more than three symbols 625 (e.g., four symbols 625, as shown).

In some aspects, the REG bundles 605 may be mapped to symbol groups of the CORESET 620, as described in connection with FIG. 5. As shown in FIG. 6, the REG bundles 605 may be mapped to a first symbol group 630 that includes two symbols 625 and a second symbol group 635 that includes two symbols 625.

In some aspects, as shown in FIG. 6, the REG bundles 605 may be mapped to symbol groups first by time and second by frequency. For example, the REG bundles 605 (which are read out of the matrix 610 by column) may be mapped first to resources in the first symbol group 630 and the second symbol group 635 at a first frequency location, second mapped to resources in the first symbol group 630 and the second symbol group 635 at a second frequency location, and so forth. In other words, the REG bundles 605 may be mapped to resources of the first symbol group 630 and the second symbol group 635 in the first frequency location before being mapped to resources of the first symbol group 630 and the second symbol group 635 in the second frequency location. A frequency location may correspond to a frequency domain range of an REG bundle 605.

As shown by reference number 640, the mapping of the REG bundles 605 to the plurality of CCEs (e.g., first by time and second by frequency) may result in an interleaving of the REG bundles 605 in the plurality of CCEs of the CORESET 620. In this way, REG bundles 605 of the same PDCCH may be distributed across different symbols 625 and/or resource blocks, thereby improving a diversity of the PDCCH.

As indicated above, FIG. 6 is provided as an example. Other examples may differ from what is described with respect to FIG. 6.

Figure 7:
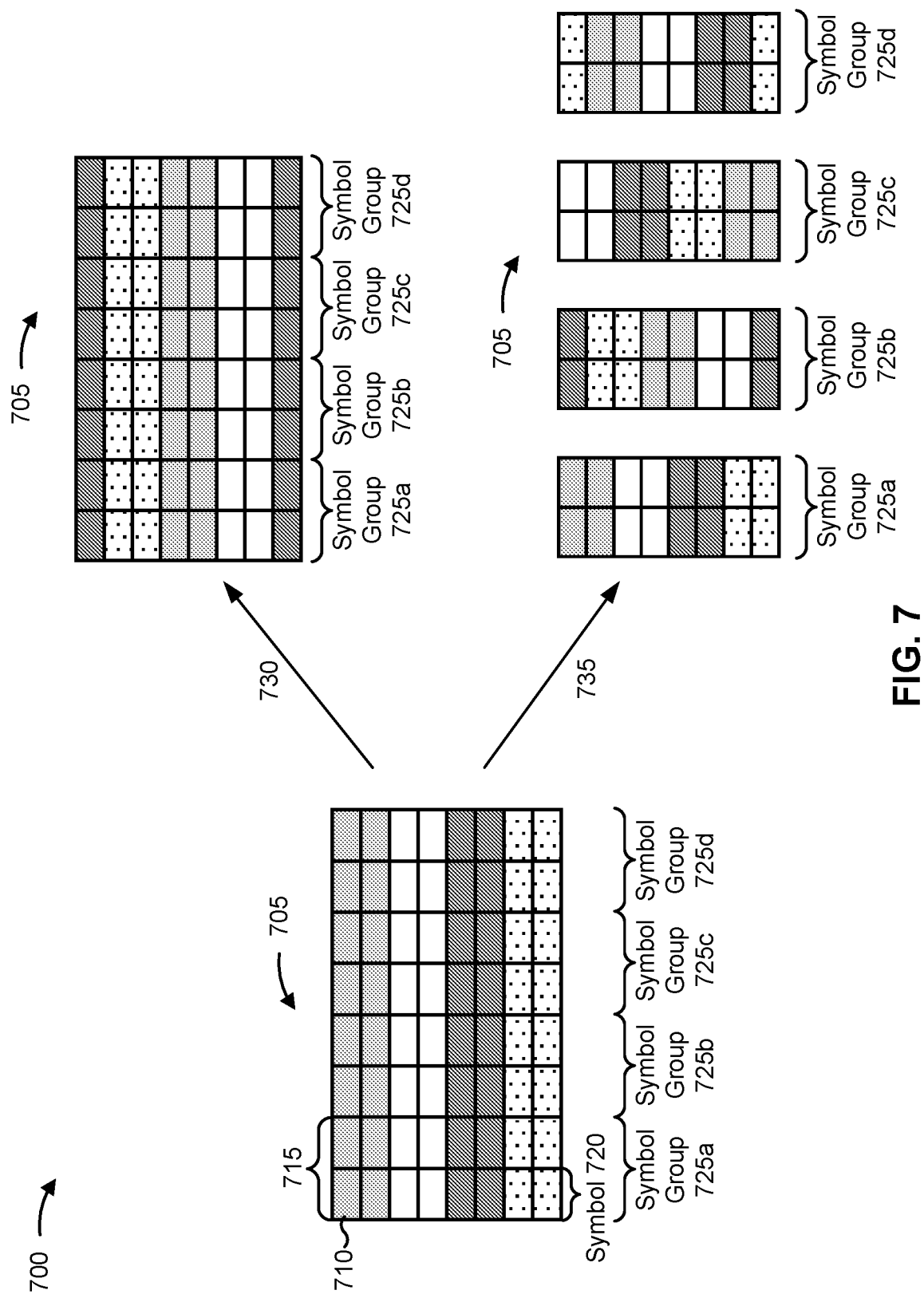
FIGS. 7 and 8 are diagrams illustrating examples of cyclic shifting of a CORESET, in accordance with various aspects of the present disclosure.

FIG. 7 is a diagram illustrating an example 700 of cyclic shifting of a CORESET, in accordance with various aspects of the present disclosure. In particular, example 700 may illustrate an example of cyclic shifting a CORESET that is in more than three symbols (e.g., four symbols, six symbols, eight symbols, twelve symbols, or the like). The CORESET may be interleaved (e.g., according to the interleaving described in connection with FIG. 5 or FIG. 6) or non-interleaved.

As shown in FIG. 7, a CORESET 705 may include a plurality of REGs 710. The REGs 710 may be grouped into a plurality of REG bundles 715. For example, as shown, an REG bundle 715 may include two REGs 710. As described above, the CORESET 705 may be in more than three symbols 720 (e.g., eight symbols 720, as shown). Accordingly, the more than three symbols of the CORESET 705 may be grouped into two or more symbol groups, as described in connection with FIG. 5. For example, as shown, the CORESET 705 may include a first symbol group 725a, a second symbol group 725b, a third symbol group 725c, and a fourth symbol group 725d, that each include two symbols 720. A symbol group 725 may include REG bundles 715 that are in the symbols 720 included in the symbol group 725.

As shown by reference number 730, in some aspects, the REG bundles 715 of the CORESET 705 may be cyclic shifted (e.g., by BS 110) according to a common frequency domain cyclic shift for the symbol groups 725. That is, the REG bundles 715 for each of the symbol groups 725 may be cyclic shifted, in the frequency domain, by the same quantity of resource blocks (e.g., the same cyclic shift index).

As shown by reference number 735, in some aspects, the REG bundles 715 of the CORESET 705 may be cyclic shifted (e.g., by BS 110) according to a respective frequency domain cyclic shift for the symbol groups 725. That is, the REG bundles 715 for each of the symbol groups 725 may be cyclic shifted, in the frequency domain, by respective quantities of resource blocks (e.g., respective cyclic shift indices). For example, the REG bundles 715 for a first symbol group 725a may be cyclic shifted according to a first cyclic shift (e.g., zero REG bundles in the time domain, as shown), the REG bundles 715 for a second symbol group 725b may be cyclic shifted according to a second cyclic shift (e.g., five REG bundles in the frequency domain, as shown), the REG bundles 715 for a third symbol group 725c may be cyclic shifted according to a third cyclic shift (e.g., two REG bundles in the frequency domain, as shown), and so forth.

In some aspects, a cyclic shift configuration transmitted by the BS 110 may identify respective cyclic shifts for the symbol groups 725 (or a common cyclic shift for the symbol groups 725). In some aspects, the UE 120 may determine respective cyclic shifts for the symbol groups 725 (or a common cyclic shift for the symbol groups 725) based at least in part on respective starting symbol indices for the symbol groups 725. For example, the UE 120 may determine a first cyclic shift for a first symbol group 725a based at least in part on a first starting symbol of the first symbol group 725a, a second cyclic shift for a second symbol group 725b based at least in part on a second starting symbol of the second symbol group 725b, and so forth.

As indicated above, FIG. 7 is provided as an example. Other examples may differ from what is described with respect to FIG. 7.

Figure 8:
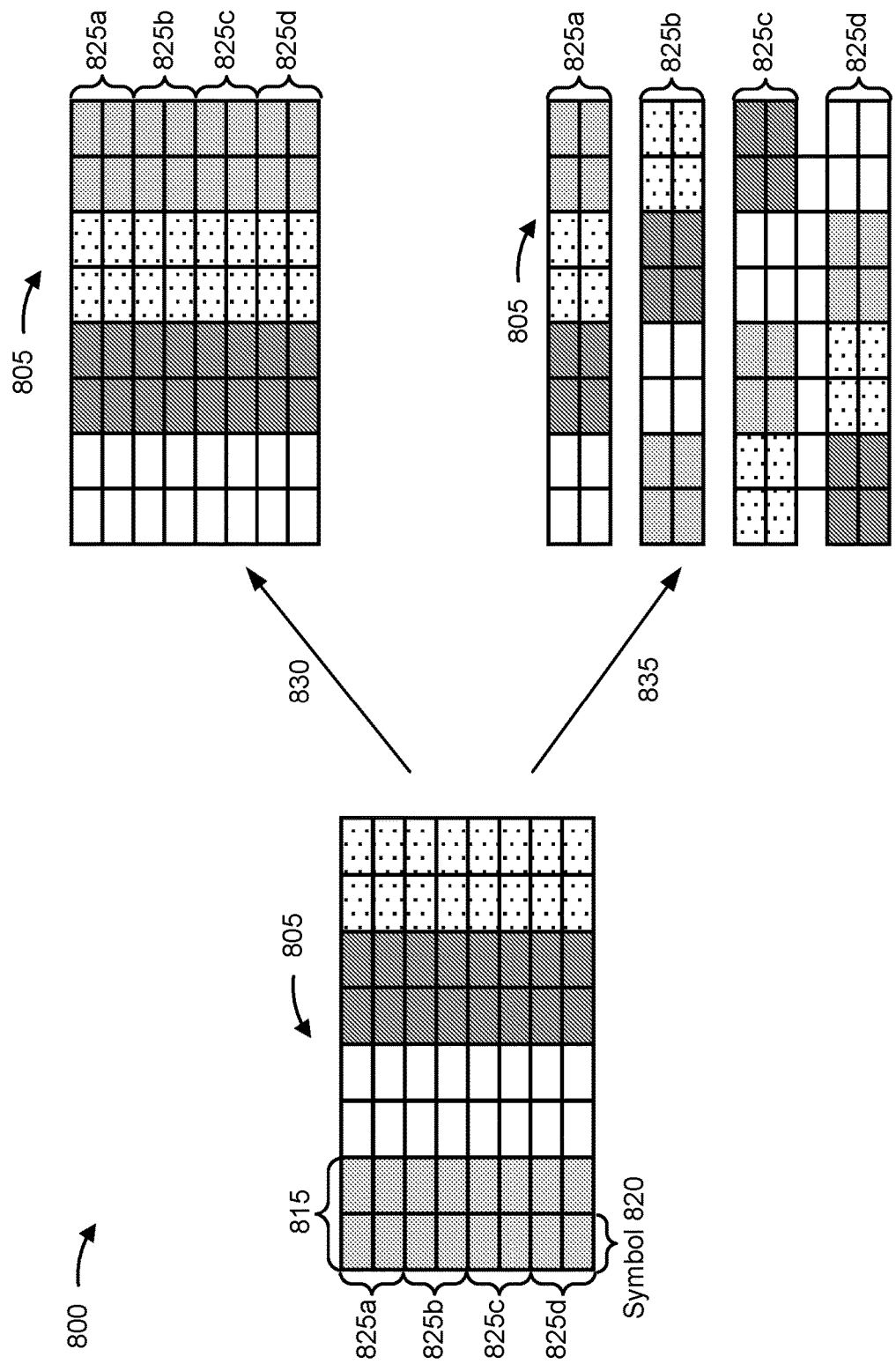

FIG. 8 is a diagram illustrating an example 800 of cyclic shifting of a CORESET, in accordance with various aspects of the present disclosure. In particular, example 800 may illustrate an example of cyclic shifting of a CORESET that is in more than three symbols (e.g., four symbols, six symbols, eight symbols, twelve symbols, or the like). The CORESET may be interleaved (e.g., according to the interleaving described in connection with FIG. 5 or FIG. 6) or non-interleaved.

As shown in FIG. 8, a CORESET 805 may include a plurality of REGs 810 that may be grouped into a plurality of REG bundles 815, as described in connection with FIG. 7. As described above, the CORESET 805 may be in more than three symbols 820, which may be grouped into two or more symbol groups, as described in connection with FIG. 5. As also shown in FIG. 8, frequency resources of the CORESET 805 may be grouped into a plurality of frequency domain ranges 825a, 825b, 825c, and 825d. A frequency domain range may include a range of frequency domain resources, such as one or more subcarriers. For example, a frequency domain range may correspond to a frequency range of one or more REG bundles 815 (e.g., two REG bundles 815, as shown).

As shown by reference number 830, in some aspects, the REG bundles 815 of the CORESET 705 may be cyclic shifted (e.g., by BS 110) according to a common time domain cyclic shift for the frequency domain ranges 825. That is, the REG bundles 815 for each of the frequency domain ranges 825 may be cyclic shifted by the same quantity of REG bundle units in the time domain. For example, as shown, the REG bundles 815 may be cyclic shifted by one REG bundle unit in the time domain (e.g., across all resource blocks).

As shown by reference number 835, in some aspects, the REG bundles 815 of the CORESET 805 may be cyclic shifted (e.g., by BS 110) according to a respective time domain cyclic shift for the frequency domain ranges 825. That is, the REG bundles 815 for each of the frequency domain ranges 825 may be cyclic shifted by respective quantities of REG bundle units in the time domain. For example, the REG bundles 815 for a first frequency domain range 825*a* may be cyclic shifted by a first cyclic shift (e.g., one REG bundle unit in the time domain, as shown), the REG bundles 815 for a second frequency domain range 825*b* may be cyclic shifted by a second cyclic shift (e.g., zero REG bundle units in the time domain, as shown), the REG bundles 815 for a third frequency domain range 825*c* may be cyclic shifted by a third cyclic shift (e.g., three REG bundle units in the time domain, as shown), and so forth.

In some aspects, a cyclic shift configuration transmitted by the BS 110 may identify respective cyclic shifts for the frequency domain ranges 825 (or a common cyclic shift for the frequency domain ranges 825). In some aspects, the UE 120 may determine respective cyclic shifts for the frequency domain ranges 825 (or a common cyclic shift for the frequency domain ranges 825) based at least in part on respective starting resource blocks (e.g., indices of the respective starting resource blocks) of the frequency domain ranges 825. For example, the UE 120 may determine a first cyclic shift for a first frequency domain range 825*a* based at least in part on a first starting resource block of the first frequency domain range 825*a*, a second cyclic shift for a second frequency domain range 825*b* based at least in part on a second starting resource block of the second frequency domain range 825*b*, and so forth.

In some aspects, the REG bundles 815 of the CORESET 805 may be cyclic shifted in both the frequency domain and the time domain (e.g., by frequency domain first or by time domain first). For example, the REG bundles 815 may be cyclic shifted by at least one of a common frequency domain cyclic shift for symbol groups of the CORESET 805 or a respective frequency domain cyclic shift for the symbol groups, as described in connection with FIG. 7. Continuing with the previous example, the REG bundles may also be cyclic shifted by at least one of a common time domain cyclic shift for the frequency domain ranges 825 or a respective time domain cyclic shift for the frequency domain ranges 825, as described above.

As indicated above, FIG. 8 is provided as an example. Other examples may differ from what is described with respect to FIG. 8.

Figure 9:
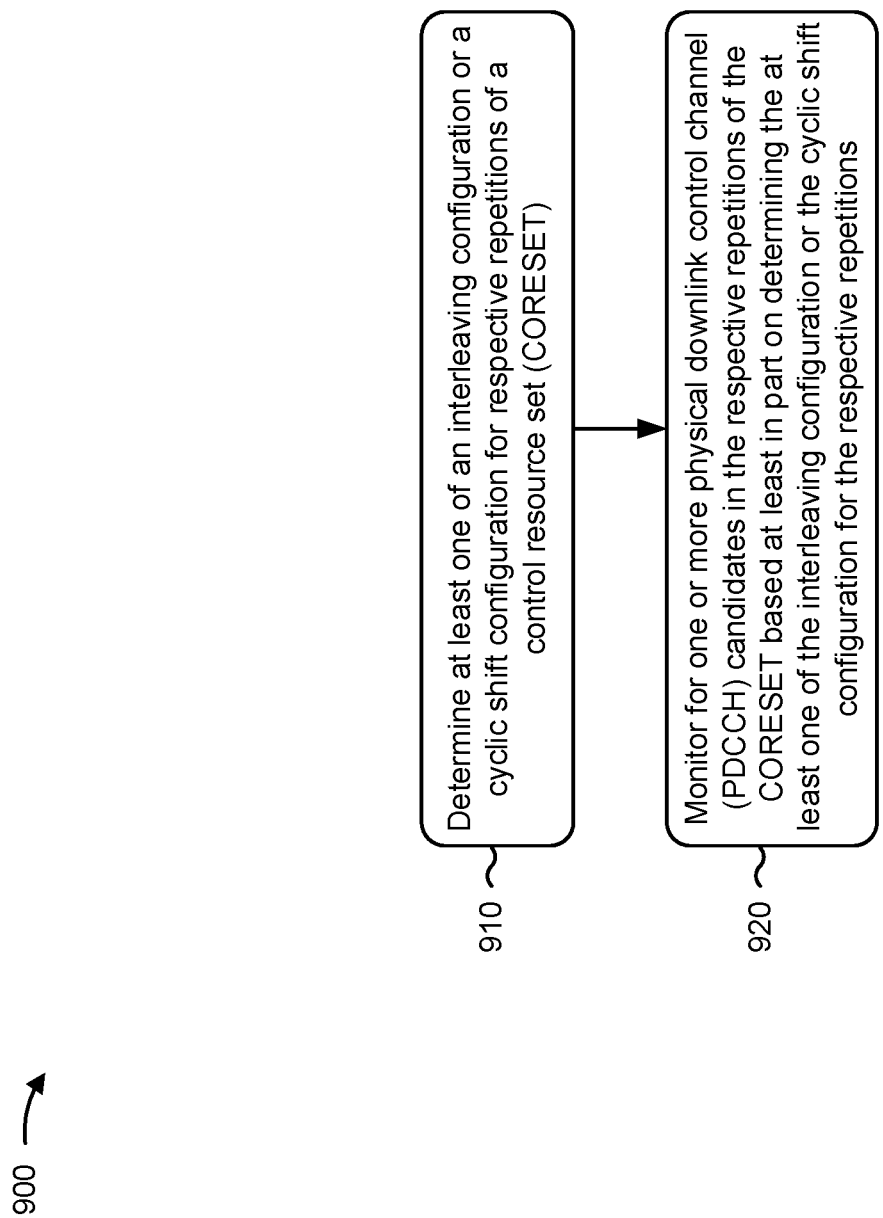
FIG. 9 is a diagram illustrating an example process performed, for example, by a UE, in accordance with various aspects of the present disclosure.

FIG. 9 is a diagram illustrating an example process 900 performed, for example, by a UE, in accordance with various aspects of the present disclosure. Example process 900 is an example where the UE (e.g., UE 120, and/or the like) performs operations associated with interleaving or cyclic shifting of a CORESET.

As shown in FIG. 9, in some aspects, process 900 may include determining at least one of an interleaving configuration or a cyclic shift configuration for respective repetitions of a CORESET (block 910). For example, the UE (e.g., using controller/processor 280, and/or the like) may determine at least one of an interleaving configuration or a cyclic shift configuration for respective repetitions of a CORESET, as described above.

As further shown in FIG. 9, in some aspects, process 900 may include monitoring for one or more PDCCH candidates in the respective repetitions of the CORESET based at least in part on determining the at least one of the interleaving configuration or the cyclic shift configuration for the respective repetitions (block 920). For example, the UE (e.g., using antenna 252, DEMOD 254, MIMO detector 256, receive processor 258, controller/processor 280, and/or the like) may monitor for one or more PDCCH candidates in the respective repetitions of the CORESET based at least in part on determining the at least one of the interleaving configuration or the cyclic shift configuration for the respective repetitions, as described above.

Process 900 may include additional aspects, such as any single aspect or any combination of aspects described below and/or in connection with one or more other processes described elsewhere herein.

In a first aspect, the respective repetitions of the CORESET are in a single slot. In a second aspect, alone or in combination with the first aspect, the respective repetitions of the CORESET are in multiple slots.

In a third aspect, alone or in combination with one or more of the first and second aspects, a first interleaving configuration for a first repetition of the CORESET identifies a first interleaving pattern, and a second interleaving configuration for a second repetition of the CORESET identifies a second interleaving pattern. In a fourth aspect, alone or in combination with one or more of the first through third aspects, a first cyclic shift configuration for a first repetition of the CORESET identifies a first cyclic shift index, and a second cyclic shift configuration for a second repetition of the CORESET identifies a second cyclic shift index.

In a fifth aspect, alone or in combination with one or more of the first through fourth aspects, process 900 includes receiving the at least one of the interleaving configuration or the cyclic shift configuration for the respective repetitions via radio resource control signaling. In a sixth aspect, alone or in combination with one or more of the first through fifth aspects, the at least one of the interleaving configuration or the cyclic shift configuration is determined for a repetition of the CORESET based at least in part on a slot index or a starting symbol index of the repetition.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
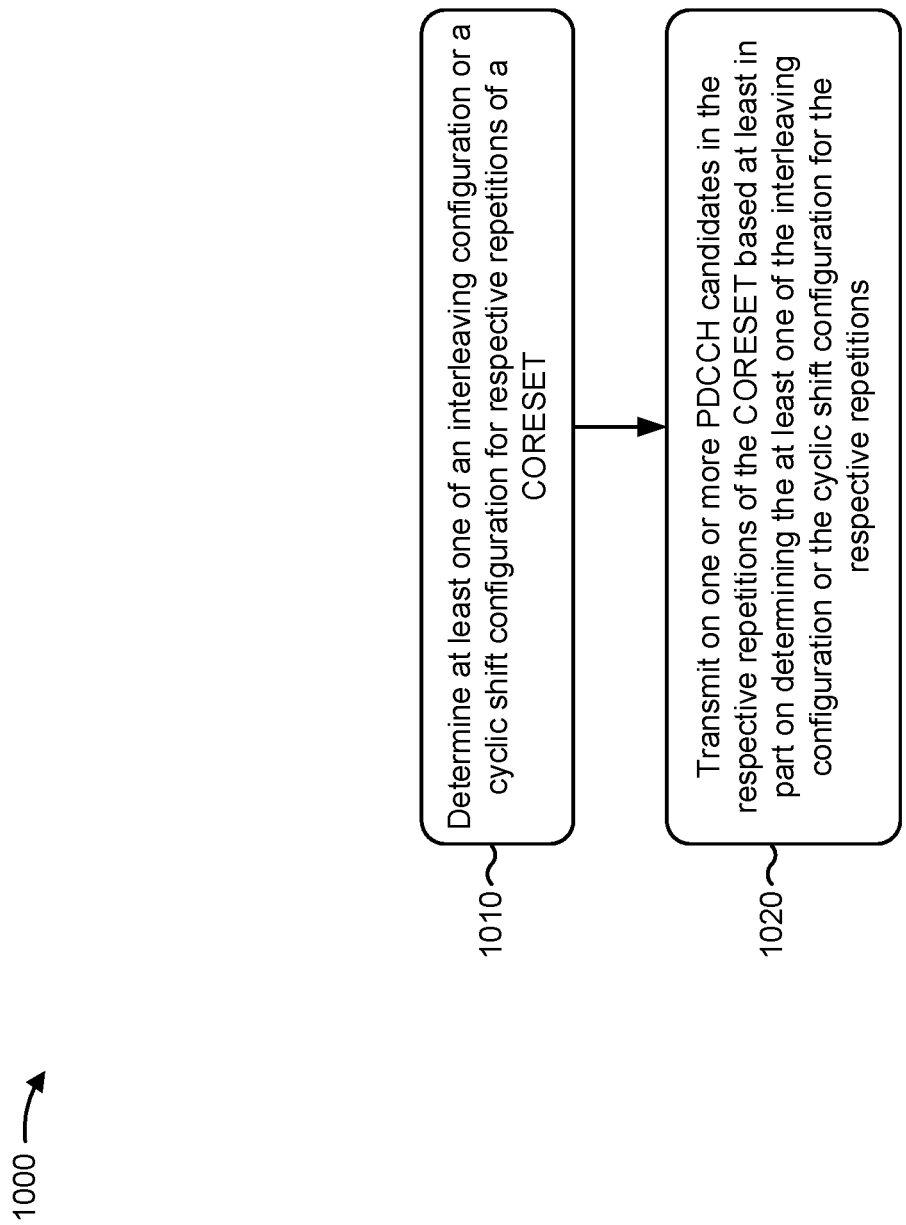
FIG. 10 is a diagram illustrating an example process performed, for example, by a BS, in accordance with various aspects of the present disclosure.

FIG. 10 is a diagram illustrating an example process 1000 performed, for example, by a BS, in accordance with various aspects of the present disclosure. Example process 1000 is an example where the BS (e.g., BS 110, and/or the like) performs operations associated with interleaving or cyclic shifting of a CORESET.

As shown in FIG. 10, in some aspects, process 1000 may include determining at least one of an interleaving configuration or a cyclic shift configuration for respective repetitions of a CORESET (block 1010). For example, the BS (e.g., using controller/processor 240, and/or the like) may determine at least one of an interleaving configuration or a cyclic shift configuration for respective repetitions of a CORESET, as described above.

As further shown in FIG. 10, in some aspects, process 1000 may include transmitting on one or more PDCCH candidates in the respective repetitions of the CORESET based at least in part on determining the at least one of the interleaving configuration or the cyclic shift configuration for the respective repetitions (block 1020). For example, the BS (e.g., using controller/processor 240, transmit processor 220, TX MIMO processor 230, MOD 232, antenna 234, and/or the like) may transmit on one or more PDCCH candidates in the respective repetitions of the CORESET based at least in part on determining the at least one of the interleaving configuration or the cyclic shift configuration for the respective repetitions, as described above.

Process 1000 may include additional aspects, such as any single aspect or any combination of aspects described below and/or in connection with one or more other processes described elsewhere herein.

In a first aspect, the respective repetitions of the CORESET are in a single slot. In a second aspect, alone or in combination with the first aspect, the respective repetitions of the CORESET are in multiple slots.

In a third aspect, alone or in combination with one or more of the first and second aspects, a first interleaving configuration for a first repetition of the CORESET identifies a first interleaving pattern, and a second interleaving configuration for a second repetition of the CORESET identifies a second interleaving pattern. In a fourth aspect, alone or in combination with one or more of the first through third aspects, a first cyclic shift configuration for a first repetition of the CORESET identifies a first cyclic shift index, and a second cyclic shift configuration for a second repetition of the CORESET identifies a second cyclic shift index.

In a fifth aspect, alone or in combination with one or more of the first through fourth aspects, process 1000 includes transmitting the at least one of the interleaving configuration or the cyclic shift configuration for the respective repetitions via radio resource control signaling. In a sixth aspect, alone or in combination with one or more of the first through fifth aspects, the at least one of the interleaving configuration or the cyclic shift configuration is determined for a repetition of the CORESET based at least in part on a slot index or a starting symbol index of the repetition.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
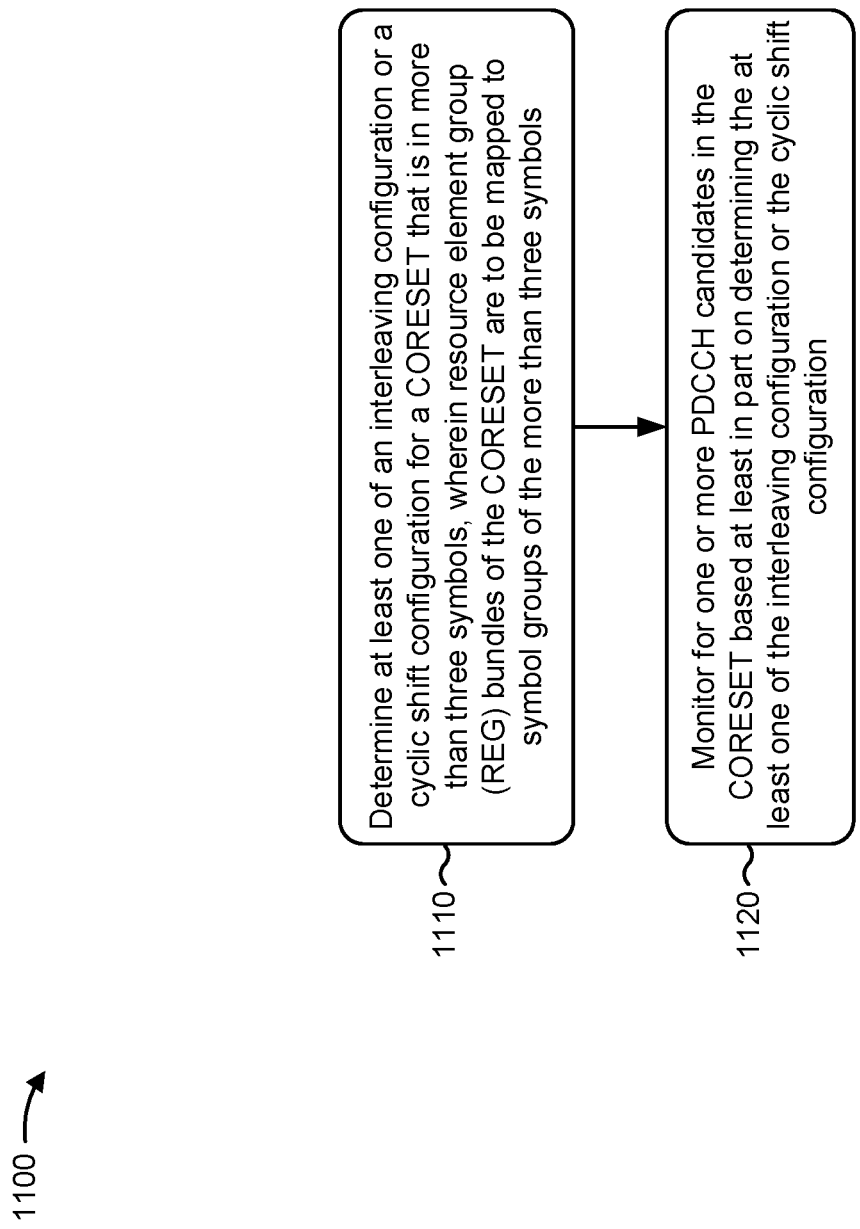
FIG. 11 is a diagram illustrating an example process performed, for example, by a UE, in accordance with various aspects of the present disclosure.

FIG. 11 is a diagram illustrating an example process 1100 performed, for example, by a UE, in accordance with various aspects of the present disclosure. Example process 1100 is an example where the UE (e.g., UE 120, and/or the like) performs operations associated with interleaving or cyclic shifting of a CORESET.

As shown in FIG. 11, in some aspects, process 1100 may include determining at least one of an interleaving configuration or a cyclic shift configuration for a CORESET that is in more than three symbols, wherein REG bundles of the CORESET are to be mapped to symbol groups of the more than three symbols (block 1110). For example, the UE (e.g., using controller/processor 280, and/or the like) may determine at least one of an interleaving configuration or a cyclic shift configuration for a CORESET that is in more than three symbols, as described above. In some aspects, REG bundles of the CORESET are to be mapped to symbol groups of the more than three symbols.

As further shown in FIG. 11, in some aspects, process 1100 may include monitoring for one or more PDCCH candidates in the CORESET based at least in part on determining the at least one of the interleaving configuration or the cyclic shift configuration (block 1120). For example, the UE (e.g., using antenna 252, DEMOD 254, MIMO detector 256, receive processor 258, controller/processor 280, and/or the like) may monitor for one or more PDCCH candidates in the CORESET based at least in part on determining the at least one of the interleaving configuration or the cyclic shift configuration, as described above.

Process 1100 may include additional aspects, such as any single aspect or any combination of aspects described below and/or in connection with one or more other processes described elsewhere herein.

In a first aspect, an REG bundle is in three or fewer symbols. In a second aspect, alone or in combination with the first aspect, a quantity of symbols in a symbol group corresponds to a quantity of symbols in an REG bundle.

In a third aspect, alone or in combination with one or more of the first and second aspects, the interleaving configuration indicates that the REG bundles are to be mapped to the symbol groups first by frequency and second by time. In a fourth aspect, alone or in combination with one or more of the first through third aspects, the interleaving configuration indicates that the REG bundles are to be mapped to the symbol groups first by time and second by frequency.

In a fifth aspect, alone or in combination with one or more of the first through fourth aspects, the cyclic shift configuration identifies a common frequency domain cyclic shift for the symbol groups. In a sixth aspect, alone or in combination with one or more of the first through fifth aspects, the cyclic shift configuration identifies a respective frequency domain cyclic shift for the symbol groups.

In a seventh aspect, alone or in combination with one or more of the first through sixth aspects, the cyclic shift configuration identifies a common time domain cyclic shift for multiple frequency domain ranges of the CORESET. In an eighth aspect, alone or in combination with one or more of the first through seventh aspects, the cyclic shift configuration identifies a respective time domain cyclic shift for multiple frequency domain ranges of the CORESET.

In a ninth aspect, alone or in combination with one or more of the first through eighth aspects, the cyclic shift configuration identifies at least one of a common frequency domain cyclic shift for the symbol groups or a respective frequency domain cyclic shift for the symbol groups, and at least one of a common time domain cyclic shift for multiple frequency domain ranges of the CORESET or a respective time domain cyclic shift for the multiple frequency domain ranges.

In a tenth aspect, alone or in combination with one or more of the first through ninth aspects, process 1100 includes receiving the at least one of the interleaving configuration or the cyclic shift configuration via radio resource control signaling. In an eleventh aspect, alone or in combination with one or more of the first through tenth aspects, the cyclic shift configuration identifies a cyclic shift for a symbol group that is determined based at least in part on a starting symbol of the symbol group, or a cyclic shift for a frequency domain range that is determined based at least in part on a starting physical resource block of the frequency domain range.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
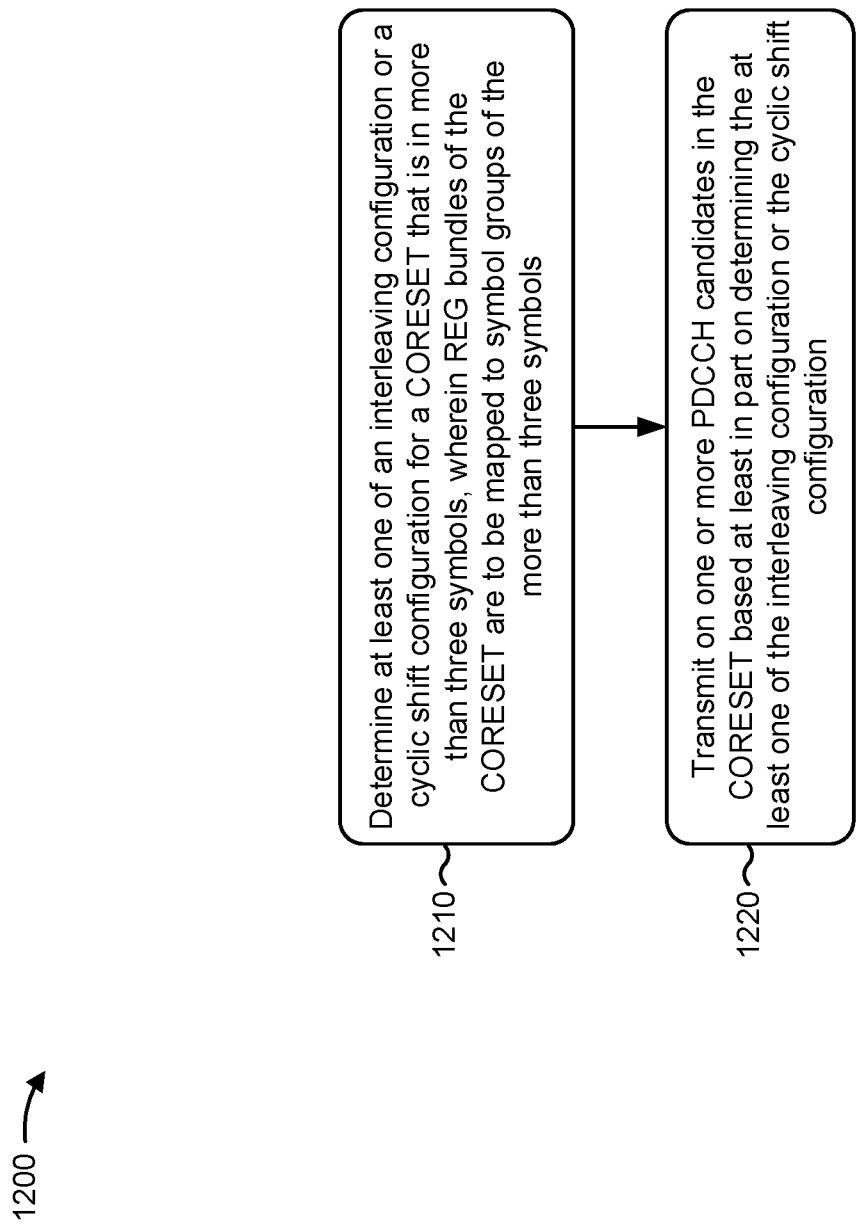
FIG. 12 is a diagram illustrating an example process performed, for example, by a BS, in accordance with various aspects of the present disclosure.

FIG. 12 is a diagram illustrating an example process 1200 performed, for example, by a BS, in accordance with various aspects of the present disclosure. Example process 1200 is an example where the BS (e.g., BS 110, and/or the like) performs operations associated with interleaving or cyclic shifting of a CORESET.

As shown in FIG. 12, in some aspects, process 1200 may include determining at least one of an interleaving configuration or a cyclic shift configuration for a CORESET that is in more than three symbols, wherein REG bundles of the CORESET are to be mapped to symbol groups of the more than three symbols (block 1210). For example, the BS (e.g., using controller/processor 240, and/or the like) may determine at least one of an interleaving configuration or a cyclic shift configuration for a CORESET that is in more than three symbols, as described above. In some aspects, REG bundles of the CORESET are to be mapped to symbol groups of the more than three symbols.

As further shown in FIG. 12, in some aspects, process 1200 may include transmitting on one or more PDCCH candidates in the CORESET based at least in part on determining the at least one of the interleaving configuration or the cyclic shift configuration (block 1220). For example, the BS (e.g., using controller/processor 240, transmit processor 220, TX MIMO processor 230, MOD 232, antenna 234, and/or the like) may transmit on one or more PDCCH candidates in the CORESET based at least in part on determining the at least one of the interleaving configuration or the cyclic shift configuration, as described above.

Process 1200 may include additional aspects, such as any single aspect or any combination of aspects described below and/or in connection with one or more other processes described elsewhere herein.

In a first aspect, an REG bundle is in three or fewer symbols. In a second aspect, alone or in combination with the first aspect, a quantity of symbols in a symbol group corresponds to a quantity of symbols in an REG bundle.

In a third aspect, alone or in combination with one or more of the first and second aspects, the interleaving configuration indicates that the REG bundles are to be mapped to the symbol groups first by frequency and second by time. In a fourth aspect, alone or in combination with one or more of the first through third aspects, the interleaving configuration indicates that the REG bundles are to be mapped to the symbol groups first by time and second by frequency.

In a fifth aspect, alone or in combination with one or more of the first through fourth aspects, the cyclic shift configuration identifies a common frequency domain cyclic shift for the symbol groups. In a sixth aspect, alone or in combination with one or more of the first through fifth aspects, the cyclic shift configuration identifies a respective frequency domain cyclic shift for the symbol groups.

In a seventh aspect, alone or in combination with one or more of the first through sixth aspects, the cyclic shift configuration identifies a common time domain cyclic shift for multiple frequency domain ranges of the CORESET. In an eighth aspect, alone or in combination with one or more of the first through seventh aspects, the cyclic shift configuration identifies a respective time domain cyclic shift for multiple frequency domain ranges of the CORESET.

In a ninth aspect, alone or in combination with one or more of the first through eighth aspects, the cyclic shift configuration identifies at least one of a common frequency domain cyclic shift for the symbol groups or a respective frequency domain cyclic shift for the symbol groups, and at least one of a common time domain cyclic shift for multiple frequency domain ranges of the CORESET or a respective time domain cyclic shift for the multiple frequency domain ranges.

In a tenth aspect, alone or in combination with one or more of the first through ninth aspects, process 1200 includes transmitting the at least one of the interleaving configuration or the cyclic shift configuration via radio resource control signaling. In an eleventh aspect, alone or in combination with one or more of the first through tenth aspects, the cyclic shift configuration identifies a cyclic shift for a symbol group that is determined based at least in part on a starting symbol of the symbol group, or a cyclic shift for a frequency domain range that is determined based at least in part on a starting physical resource block of the frequency domain range.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed:

1. A method of wireless communication performed by a user equipment (UE), comprising:
   determining at least one of an interleaving configuration or a cyclic shift configuration for respective repetitions of a control resource set (CORESET), wherein the interleaving configuration identifies a quantity of rows that is to be used for interleaving the CORESET, and wherein:
      a first interleaving configuration for a first repetition of the CORESET identifies a first interleaving pattern, and a second interleaving configuration for a second repetition of the CORESET identifies a second interleaving pattern; or
      a first cyclic shift configuration for the first repetition of the CORESET identifies a first cyclic shift index, and a second cyclic shift configuration for the second repetition of the CORESET identifies a second cyclic shift index; and
   monitoring for one or more physical downlink control channel (PDCCH) candidates in the respective repetitions of the CORESET based at least in part on the at least one of the interleaving configuration or the cyclic shift configuration for the respective repetitions.

2. The method of claim 1, wherein the respective repetitions of the CORESET are in a single slot.

3. The method of claim 1, wherein the respective repetitions of the CORESET are in multiple slots.

4. The method of claim 1, further comprising:
   receiving the at least one of the interleaving configuration or the cyclic shift configuration for the respective repetitions via radio resource control signaling.

5. The method of claim 1, wherein the at least one of the interleaving configuration or the cyclic shift configuration is determined for a repetition of the CORESET based at least in part on a slot index or a starting symbol index of the repetition.

6. A method of wireless communication performed by a base station, comprising:
   determining at least one of an interleaving configuration or a cyclic shift configuration for respective repetitions of a control resource set (CORESET), wherein the interleaving configuration identifies a quantity of rows that is to be used for interleaving the CORESET, and wherein:
      a first interleaving configuration for a first repetition of the CORESET identifies a first interleaving pattern, and a second interleaving configuration for a second repetition of the CORESET identifies a second interleaving pattern; or
      a first cyclic shift configuration for the first repetition of the CORESET identifies a first cyclic shift index, and a second cyclic shift configuration for the second repetition of the CORESET identifies a second cyclic shift index; and
   transmitting on one or more physical downlink control channel (PDCCH) candidates in the respective repetitions of the CORESET based at least in part on the at least one of the interleaving configuration or the cyclic shift configuration for the respective repetitions.

7. The method of claim 6, wherein the respective repetitions of the CORESET are in a single slot.

8. The method of claim 6, wherein the respective repetitions of the CORESET are in multiple slots.

9. The method of claim 6, further comprising:
   transmitting the at least one of the interleaving configuration or the cyclic shift configuration for the respective repetitions via radio resource control signaling.

10. The method of claim 6, wherein the at least one of the interleaving configuration or the cyclic shift configuration is determined for a repetition of the CORESET based at least in part on a slot index or a starting symbol index of the repetition.

11. A method of wireless communication performed by a user equipment (UE), comprising:
    determining at least one of an interleaving configuration or a cyclic shift configuration for a control resource set (CORESET) that is in more than three symbols, wherein the interleaving configuration identifies a quantity of rows that is to be used for interleaving the CORESET,
       wherein resource element group (REG) bundles of the CORESET are to be mapped to two or more symbol groups of the more than three symbols, wherein each symbol group of the two or more symbol groups includes equivalent quantities of symbols of the CORESET; and
    monitoring for one or more physical downlink control channel (PDCCH) candidates in the CORESET based at least in part on the at least one of the interleaving configuration or the cyclic shift configuration.

12. The method of claim 11, wherein an REG bundle is in three or fewer symbols.

13. The method of claim 11, wherein a quantity of symbols in a symbol group corresponds to a quantity of symbols in an REG bundle.

14. The method of claim 11, wherein the interleaving configuration indicates that the REG bundles are to be mapped to the two or more symbol groups first by frequency and second by time.

15. The method of claim 11, wherein the interleaving configuration indicates that the REG bundles are to be mapped to the two or more symbol groups first by time and second by frequency.

16. The method of claim 11, wherein the cyclic shift configuration identifies a common frequency domain cyclic shift for the symbol groups.

17. The method of claim 11, wherein the cyclic shift configuration identifies a respective frequency domain cyclic shift for the symbol groups.

18. The method of claim 11, wherein the cyclic shift configuration identifies a common time domain cyclic shift for multiple frequency domain ranges of the CORESET.

19. The method of claim 11, wherein the cyclic shift configuration identifies a respective time domain cyclic shift for multiple frequency domain ranges of the CORESET.

20. The method of claim 11, wherein the cyclic shift configuration identifies:
    at least one of a common frequency domain cyclic shift for the symbol groups or a respective frequency domain cyclic shift for the symbol groups; and
    at least one of a common time domain cyclic shift for multiple frequency domain ranges of the CORESET or a respective time domain cyclic shift for the multiple frequency domain ranges.

21. The method of claim 11, further comprising:
    receiving the at least one of the interleaving configuration or the cyclic shift configuration via radio resource control signaling.

22. The method of claim 11, wherein the cyclic shift configuration identifies:
a cyclic shift for a symbol group that is determined based at least in part on a starting symbol of the symbol group; or
a cyclic shift for a frequency domain range that is determined based at least in part on a starting physical resource block of the frequency domain range.

23. A method of wireless communication performed by a base station, comprising:
determining at least one of an interleaving configuration or a cyclic shift configuration for a control resource set (CORESET) that is in more than three symbols, wherein the interleaving configuration identifies a quantity of rows that is to be used for interleaving the CORESET,
wherein resource element group (REG) bundles of the CORESET are to be mapped to two or more symbol groups of the more than three symbols wherein each symbol group of the two or more symbol groups includes equivalent quantities of symbols of the CORESET; and
transmitting on one or more physical downlink control channel (PDCCH) candidates in the CORESET based at least in part on the at least one of the interleaving configuration or the cyclic shift configuration.

24. The method of claim 23, wherein an REG bundle is in three or fewer symbols.

25. The method of claim 23, wherein a quantity of symbols in a symbol group corresponds to a quantity of symbols in an REG bundle.

26. The method of claim 23, further comprising:
transmitting the at least one of the interleaving configuration or the cyclic shift configuration via radio resource control signaling.

27. The method of claim 23, wherein the interleaving configuration indicates that the REG bundles are to be mapped to the two or more symbol groups first by frequency and second by time.

28. The method of claim 23, wherein the interleaving configuration indicates that the REG bundles are to be mapped to the two or more symbol groups first by time and second by frequency.

29. The method of claim 23, wherein the cyclic shift configuration identifies a common frequency domain cyclic shift for the symbol groups.

30. The method of claim 23, wherein the cyclic shift configuration identifies a respective frequency domain cyclic shift for the symbol groups.

* * * * *